(12) United States Patent
Iversen

(10) Patent No.: US 8,842,222 B2
(45) Date of Patent: Sep. 23, 2014

(54) DOUBLE STACKED PROJECTION

(75) Inventor: Steen Svendstorp Iversen, Lyngby (DK)

(73) Assignee: IMAX Corporation, Mississauga, ON ( * ) Notice: Subject to any disclaimer, the term of this patent is extended or adjusted under 35 U.S.C. 154(b) by 0 days.

(21) Appl. No.: 13/641,676

(22) PCT Filed: Apr. 18, 2011

(86) PCT No.: PCT/EP2011/056173
§ 371 (c)(1),
(2), (4) Date: Dec. 14, 2012

(87) PCT Pub. No.: WO2011/134834
PCT Pub. Date: Nov. 3, 2011

(65) Prior Publication Data
US 2013/0201403 A1 Aug. 8, 2013

Related U.S. Application Data

(60) Provisional application No. 61/356,980, filed on Jun. 21, 2010.

(30) Foreign Application Priority Data

Apr. 18, 2010 (DK) .................................. 2010 00320
Apr. 18, 2010 (DK) .................................. 2010 00321

(51) Int. Cl.
*H04N 9/67* (2006.01)
*G09G 5/10* (2006.01)
(Continued)

(52) U.S. Cl.
CPC ............. *H04N 9/67* (2013.01); *H04N 13/0459* (2013.01); *G06T 2207/20221* (2013.01); *G06T 5/50* (2013.01); *G06T 3/0093* (2013.01); *H04N 13/0434* (2013.01); *H04N 13/0007* (2013.01); *G06T 3/40* (2013.01); *H04N 9/3105* (2013.01); *H04N 13/0425* (2013.01)
USPC ............. 348/659; 345/690; 345/626; 353/30; 353/7

(58) Field of Classification Search
None
See application file for complete search history.

(56) References Cited

U.S. PATENT DOCUMENTS 4,523,226 A   6/1985   Lipton et al.
4,868,773 A   9/1989   Coyle et al.
(Continued)

FOREIGN PATENT DOCUMENTS

DE   2827622   1/1980
DE   19545356   5/1996
(Continued)

OTHER PUBLICATIONS

International Patent Application No. PCT/SK2011/000066, "International Preliminary Report on Patentability", Dec. 28, 2012, 7 pages.
(Continued)

*Primary Examiner* — Jefferey Harold
*Assistant Examiner* — Sean Haiem
(74) *Attorney, Agent, or Firm* — Kilpatrick Townsend & Stockton LLP

(57) ABSTRACT

A method for producing a first output image and a second output image for being projected by a first projector and a second projector, respectively, is disclosed. The method comprises: providing a source image comprising a plurality of pixels, each pixel having a source value, providing an inverted threshold value for each pixel of the plurality of pixels, and generating thereof a temporary image comprising a temporary value for each pixel of the plurality of pixels. The method further comprises: generating the first output image comprising a first output value for each pixel of the plurality of pixels, the first output value being generated from the temporary value and the source value for each pixel, and generating the second output image comprising a second output value for each pixel of the plurality of pixels, the second output value being generated from the temporary value.

22 Claims, 17 Drawing Sheets

(51) Int. Cl.

| | |
|---|---|
| *G09G 5/00* | (2006.01) |
| *G03B 21/26* | (2006.01) |
| *G03B 21/00* | (2006.01) |
| *H04N 13/04* | (2006.01) |
| *G06T 5/50* | (2006.01) |
| *G06T 3/00* | (2006.01) |
| *H04N 13/00* | (2006.01) |
| *G06T 3/40* | (2006.01) |
| *H04N 9/31* | (2006.01) |

(56) References Cited

U.S. PATENT DOCUMENTS

| | | |
|---|---|---|
| 5,070,403 A | 12/1991 | Wilkinson |
| 5,384,869 A | 1/1995 | Wilkinson et al. |
| 5,561,474 A | 10/1996 | Kojima et al. |
| 5,654,805 A | 8/1997 | Boon |
| 5,663,775 A | 9/1997 | Kawamura et al. |
| 5,920,652 A | 7/1999 | Wilkinson |
| 6,018,596 A | 1/2000 | Wilkinson |
| 6,243,070 B1 | 6/2001 | Hill et al. |
| 6,396,505 B1 | 5/2002 | Lui et al. |
| 6,733,138 B2 | 5/2004 | Raskar |
| 6,751,006 B2 | 6/2004 | Zhou et al. |
| 6,760,075 B2 | 7/2004 | Mayer et al. |
| 6,804,406 B1 | 10/2004 | Chen |
| 6,843,564 B2 | 1/2005 | Putilin et al. |
| 6,984,043 B2 | 1/2006 | Nakamura et al. |
| 7,002,533 B2 | 2/2006 | Sayag |
| 7,079,157 B2 | 7/2006 | Deering |
| 7,097,311 B2 | 8/2006 | Jaynes et al. |
| 7,111,941 B2 | 9/2006 | Allen et al. |
| 7,127,084 B1 | 10/2006 | Mauk |
| 7,339,625 B2 | 3/2008 | Matthys et al. |
| 7,357,517 B2 | 4/2008 | Hasegawa |
| 7,660,470 B2 | 2/2010 | Yano |
| 7,676,072 B2 | 3/2010 | Sugiyama |
| 7,740,361 B2 | 6/2010 | Jaynes et al. |
| 7,852,327 B2 | 12/2010 | Chen et al. |
| 7,866,832 B2 | 1/2011 | Jaynes et al. |
| 7,891,818 B2 | 2/2011 | Christensen et al. |
| 7,936,361 B2 | 5/2011 | Aufranc et al. |
| 7,954,954 B2 | 6/2011 | Aufranc et al. |
| 8,016,426 B2 | 9/2011 | Artonne et al. |
| 2001/0024231 A1 | 9/2001 | Nakamura et al. |
| 2002/0196538 A1 | 12/2002 | Lantz et al. |
| 2004/0085256 A1 | 5/2004 | Hereld et al. |
| 2004/0239885 A1* | 12/2004 | Jaynes et al. ............... 353/30 |
| 2006/0221249 A1 | 10/2006 | Lin et al. |
| 2007/0091277 A1 | 4/2007 | Damera-Venkata et al. |
| 2007/0132965 A1 | 6/2007 | Damera-Venkata et al. |
| 2007/0133794 A1 | 6/2007 | Cloutier et al. |
| 2007/0171380 A1 | 7/2007 | Wright et al. |
| 2008/0143969 A1 | 6/2008 | Aufranc et al. |
| 2008/0266321 A1* | 10/2008 | Aufranc et al. ............... 345/626 |
| 2008/0309884 A1* | 12/2008 | O'Dor et al. ............... 353/7 |
| 2009/0027304 A1 | 1/2009 | Aufranc et al. |
| 2009/0102915 A1 | 4/2009 | Arsenich |
| 2009/0244684 A1 | 10/2009 | Gollier |
| 2010/0177112 A1 | 7/2010 | Miyasaka et al. |
| 2013/0093805 A1 | 4/2013 | Iversen |

FOREIGN PATENT DOCUMENTS

| | | |
|---|---|---|
| JP | 2009260932 | 11/2009 |
| JP | 2011040958 | 2/2011 |
| WO | 2006116536 | 11/2006 |
| WO | 2010147451 | 12/2010 |
| WO | 2011134834 | 11/2011 |
| WO | 2011160629 | 12/2011 |
| WO | 2013057714 | 4/2013 |
| WO | 2013057717 | 4/2013 |

OTHER PUBLICATIONS

International Patent Application No. PCT/DK2011/000066, "International Search Report and Written Opinion", Sep. 28, 2011, 9 pages.
International Patent Application No. PCT/EP2011/056173, "International Search Report and Written Opinion", Jan. 6, 2012, 10 pages.
International Patent Application No. PCT/IB/2012/055749, "International Search Report and Written Opinion", Jan. 23, 2013, 7 Pages.
International Patent Application No. PCT/IB2012/055754, "International Search Report & Written Opinion", Feb. 19, 2013, 7 pages.
"XLM HD30—The ultimate high-brightness projector for high-resolution multi-windowing", URL:http://www.projectorcentral.com/pdf/projector_spec_3403.pdf, XP55014864, Jul. 1, 2006, 4 pages.
Jacobson et al., "Linear Fusion of Image Sets for Display", IEEE Transactions on Geoscience and Remote Sensing, IEEE Service Center, Piscataway, NJ, US, vol. 45, No. 10, XP011192516, ISSN: 0196-2892, DOI : 10. 1109/TGRS . 2007 . 903598, Oct. 1, 2007, 3277-3288.
Li et al., "Optical blending for multi-projector display wall systems", IEEE LEOS 12th Annual Meeting Conference Proceedings, Leos' 99, vol. 1, XPOI0361258, DOI : 10.1109/LEOS.1999.813592 ISBN : 978-0/7803-5634-4, Nov. 8, 1999, 2.
Mayer , "Design Considerations and Applications for Innovative Display Options Using Projector Arrays", Proceedings of SPIE—The International Society for Optical Engineering, Jan. 1, 1996, vol. 2650, pp. 131-139.
Okatani et al., "Study of Image Quality of Superimposed Projection Using Multiple Projectors", IEEE Transactions on Image Processing, IEEE Service Center, vol. 17, No. 2, XP011249562, ISSN: 1057-7149, Feb. 1, 2009, 424-429.
Seo et al., "Double-Layer Projection Display System Using Scattering Polarizer Film", Japanese Journal of Applied Physics, vol. 47, No. 3, XP55011651, ISSN: 0021-4922, DOI : 10.1143/JJAP. 47.1602, Mar. 1, 2008, 1602-1605.

* cited by examiner

DOUBLE STACKED PROJECTION

CROSS-REFERENCE TO RELATED APPLICATIONS

This is a U.S. national phase under 35 U.S.C. 371 of International Patent Application No. PCT/EP2011/056173, entitled "Double Stacked Projection" and filed Apr. 18, 2011, which claims benefit of priority under PCT Article 8 of Danish Application No. PA 201000320 filed Apr. 18, 2010, Danish Application No. PA 201000321 filed Apr. 18, 2010, and U.S. Provisional Application No. 61/356,980 filed Jun. 21, 2010. Each and every application is incorporated herein by reference in its entirety.

BACKGROUND OF THE INVENTION

Modern super high resolution 4K digital cinema projectors designed for normal sized cinema screens have a resolution ideal also for very large screens but lack the brightness needed for these. Double stacking projectors are an effective way of increasing brightness, but traditional double stacking is difficult at such high resolutions because the tolerance in the alignment of projected images becomes very small and is hard to meet during presentations due to thermal induced movements in the mechanical and optical parts and vibrations from the audio system. In other applications like temporary projection set-ups, home cinemas etc., alignment of double stacked projectors may be difficult to maintain even when working at much lower resolutions.

"Double stacking" of projectors, i.e. overlaying the images of two projectors projecting the same image, is a well known way to increase brightness. However, it is also well known that traditional double stacking requires high maintenance of the alignment of the projectors to maintain image quality.

In 4K projection, traditional double stacking is not considered an option, because it would be impossible to keep the sharpness and detail on par with that of a single 4K projector throughout a presentation. This is unfortunate for giant screen theatres, because while 4K projectors lend themselves well to giant screens in terms of resolution, available projectors generally do not have enough light for giant screens, so stacking would seem desirable to double the light output.

OBJECT OF THE INVENTION

An object of the invention is to present a double stacking system that overcomes the above mentioned difficulty and presents other advantages. Exemplary applications may be giant screen cinemas, simulators, conference presentations, staging, exhibits, outdoor projection, traditional cinemas, home cinemas, and other applications where brightness of a projected image is a consideration.

An object of the present invention is also to present a novel image processing system for double stacked projector configurations that overcomes the above mentioned maintenance difficulties and provides for a high quality, low-maintenance double stacking system even for 4K projection.

SUMMARY OF THE INVENTION

An image processing circuit comprising thresholding limiters and constrained smoothing filters splits a source image into two images, which, when projected overlaid on a projection surface by a pair of double-stacked projectors, together form an image essentially identical to the source image, but where one image has significantly less high frequency components. The invention presents advantages over traditional double stacking in aspects of projector alignment, content copy protection, banding artefacts and equipment costs.

GENERAL DESCRIPTION

The above objects are according to a first aspect of the present invention met by a method for producing a first output image and a second output image for being projected by a first projector and a second projector, respectively, the method comprising:
(a) providing a source image comprising a plurality of pixels, each pixel having an source value,
(b) providing a threshold value for each pixel of the plurality of pixels, in a first alternative
(d) generating a temporary image comprising a temporary value for each pixel of the plurality of pixels, the temporary value being generated in a process equivalent to: (i.i) determining a first maximum value as the maximum of the source value and its corresponding threshold value for each pixel, (i.ii) determining an intermediate value by subtracting the corresponding threshold value from the first maximum value for each pixel, (i.iii) generating the temporary value from the intermediate value for each pixel;
or in a second alternative
(c) providing an inverted threshold value for each pixel of the plurality of pixels, each inverted threshold value being an inversion of its corresponding threshold value,
(d) generating a temporary image comprising a temporary value for each pixel of the plurality of pixels, the temporary value being generated in a process equivalent to: (i.i) determining an intermediate value as the minimum of the source value and its corresponding inverted threshold value for each pixel, (i.ii) generating the temporary value from the intermediate value for each pixel;
or in a third alternative
(c) providing an inverted threshold value for each pixel of the plurality of pixels, each inverted threshold value being an inversion of its corresponding threshold value,
(d) generating a temporary image comprising a temporary value for each pixel of the plurality of pixels, the temporary value being generated in a process equivalent to: (i.i) determining a first maximum value as the maximum of the source value and its corresponding threshold value for each pixel, (i.ii) determining a first difference value by subtracting the corresponding threshold value from the first maximum value for each pixel, (i.iii) determining a first minimum value as the minimum of the source value and its corresponding inverted threshold value for each pixel, (i.iv) determining an intermediate value as the minimum of the first difference value and the first minimum value for each pixel, (i.v) generating the temporary value from the intermediate value for each pixel;
or in a fourth alternative
(c) providing an inverted threshold value for each pixel of the plurality of pixels, each inverted threshold value being an inversion of its corresponding threshold value,
(d) generating a temporary image comprising a temporary value for each pixel of the plurality of pixels, the temporary value being generated in a process equivalent to: (i.i) determining a first maximum value as the maximum of the source value and its corresponding threshold value for each pixel, (i.ii) determining a first difference value by subtracting the corresponding threshold value from the first maximum value for each pixel, (i.iii) determining a first minimum value as the minimum of the source value and its corresponding inverted threshold value for each pixel, (i.iv) determining an intermediate value from a first range of values comprising values between the first difference value and the first minimum value for each pixel, (i.v) generating the temporary value from the intermediate value for each pixel; and in all alternatives
(e) generating the first output image comprising a first output value for each pixel of the plurality of pixels, the first output value being generated from the temporary value and the source value for each pixel, and
(f) generating the second output image comprising a second output value for each pixel of the plurality of pixels, the second output value being generated from the temporary value.

The method according to the first aspect of the present invention may further comprise in the first alternative:
(c) providing an inverted threshold values for each pixel of the plurality of pixels, each inverted threshold value being an inversion of its corresponding threshold value.

The threshold value for each pixel of said plurality of pixels may be limited to be within an interval having a maximum threshold value and a minimum threshold value for each pixel. Each inverted threshold value being an inversion of its corresponding threshold value may be understood as equivalent to the inverted threshold value being equal to or approximately equal to the maximum threshold value minus the threshold value for each pixel.

The process of generating the temporary value may further comprise in all alternatives: (i.vi) smoothing the intermediate value for each pixel; and in the third and fourth alternatives: (i.vi) smoothing the first difference value and/or the first minimum value.

Smoothing the intermediate value of a pixel is here understood to involve the intermediate value of at least one other pixel, for example a neighbouring pixel. Smoothing the first difference value of a pixel is here understood to involve the first difference value of at least one other pixel, for example a neighbouring pixel. Smoothing the first minimum value of a pixel is here understood to involve the first minimum value of at least one other pixel, for example a neighbouring pixel. The smoothing may comprise a spline filter, a membrane filter, and/or an envelope filter.

The smoothing may be adapted for limiting the intermediate value to a value from the first range of values subsequent to the smoothing. The smoothing may comprise a first dilation operation comprising a first dilation radius. The first dilation radius may be 4 pixels, or approximately 0.3% of the width of the temporary image. The smoothing may comprise a first blur operation. The first dilation operation may be performed prior to the first blur operation. The first blur operation may comprise a first blur radius approximately equal to or smaller than the first dilation radius. The first blur operation may comprise a first Gaussian blur operation. The first Gaussian blur operation may have a standard deviation approximately equal to a third of the first blur radius, or approximately equal to or smaller than 4/3 pixels, or approximately 0.1% of the width of the temporary image. The first blur operation may comprise a first mean filtering operation.

The process generating the temporary value may further comprise: (i.vii) determining a second minimum value as the minimum of the intermediate value and the inverted threshold value for each pixel, (i.viii) generating a second smoothed value by smoothing the second minimum value for each pixel, and (i.ix) generating the temporary value from the second smoothed value for each pixel.

Smoothing the second minimum value of a pixel is here understood to involve the second minimum value of at least one other pixel, for example a neighbouring pixel. The smoothing of the second minimum value may comprise a spline filter, a membrane filter, and/or an envelope filter.

The smoothing of the second minimum value may comprise a second dilation operation comprising a second dilation radius. The second dilation radius may be 2 pixels, or approximately 0.17% of the width of the temporary image. The second dilation radius may be variable. The second dilation radius may be variable in a second range of values including zero. The smoothing of the second minimum value may comprise a second blur operation. The second dilation operation may be performed prior to the second blur operation. The second blur operation may comprise a second blur radius approximately equal to or smaller than the second dilation radius. The second blur radius may be variable. The second blur radius may be variable in a third range of values including zero. The second blur radius and the second dilation radius may be coupled such that one changes as a function of the other.

The second blur operation may comprise a second Gaussian blur operation. The second Gaussian blur operation may have a standard deviation approximately equal to a third of the first blur radius, or approximately equal to or smaller than ⅔ pixels, or approximately 0.055% of the width of the temporary image.

The second blur operation may comprise a second mean filtering operation.

Providing the source image may comprise: (ii.i) providing a gamma encoded source image encoded by a first gamma encoding, (ii.ii) generating a gamma decoded source image by performing a first gamma decoding of the gamma encoded source image, the gamma decoding corresponding to the first gamma encoding, and (ii.iii) outputting the gamma decoded source image as the source image.

The method according to the first aspect of the present invention may further comprise:
(g) performing a second gamma encoding of the first output image, the second gamma encoding corresponding to a second gamma decoding of the first projector.

The method according to the first aspect of the present invention may further comprise:
(h) performing a third gamma encoding of the second output image, the third gamma encoding corresponding to a third gamma decoding of the second projector.

The process of generating the temporary value may further comprise in all alternatives: (i.x) performing a first colour correction of the intermediate value for each pixel, and in the third and fourth alternatives: (i.x) performing a first colour correction of the intermediate and/or the first difference value for each pixel.

In all alternatives the first colour correction may be adapted for correcting the intermediate value to obtain approximately the same first hue as the corresponding source value and in the third and fourth alternative the first colour correction being adapted for correcting the first difference value and/or the intermediate value to obtain approximately the same first hue as the corresponding source value. The first colour correction may comprise a process equivalent to: (iii.i) calculating a constant K for each pixel, K being equal to the maximum of R11/R6, G11/G6, and B11/B6; R6, G6, and B6 are the pixel colours of the source image; and R11, G11, and B11 are the pixel colour values subsequent to determining the first intermediate value for each pixel, (iii.ii) correcting the intermediate value by replacing it with the source value multiplied with the constant K for each pixel.

The method according to the first aspect of the present invention may further comprise: (i) lowering the spatial resolution of the second output image and/or performing a blur operation on the second output image. The method according to the first aspect of the present invention may further comprise: (j) encrypting the first output image. The method according to the first aspect of the present invention may further comprise: (k) recording the first output image on a first recording medium. The method according to the first aspect of the present invention may further comprise: (l) extracting the first output image from the first recording medium. The method according to the first aspect of the present invention may further comprise: (m) recording the second output image on a second recording medium. The method according to the first aspect of the present invention may further comprise: (n) extracting the second output image from the second recording medium.

The method according to the first aspect of the present invention may further comprise: (o) performing a geometric correction of the second output image, the geometric correction being adapted for aligning an image projected by the second projector with an image projected by the first projector.

The process of generating the temporary value may further comprise: (i.xi) performing an erosion operation, preferably a grey scale erosion operation having a radius a half pixel, a full pixel, 0.04% of the width of temporary image, or 0.08% of the width of temporary image, on the intermediate value for each pixel of the plurality of pixels.

In the fourth alternative, the source value may be excluded from the first range of values for each pixel. In the fourth alternative, the first range of values may further comprise the first difference value and the first minimum value.

The first output value may be generated for each pixel in a process equivalent to: (iv.i) determining a second difference value by subtracting the temporary value from the source value for each pixel, and (iv.ii) generating the first output value from the second difference value.

The first output value may be generated for each pixel in a process equivalent to: (iv.i) determining a second difference value by subtracting the temporary value from the source value for each pixel, (iv.ii) generating a first ratio by dividing the second difference value by the threshold value for each pixel, and (iv.iii) generating the first output value from the first ratio for each pixel.

The second output value may further be generated from the inverted threshold value. The second output value may be generated for each pixel in a process equivalent to: (v.i) generating a second ratio by dividing the temporary value by the inverted threshold value for each pixel, and (v.ii) generating the second output value from the second ratio for each pixel.

The threshold value for each pixel of the plurality of pixels may represent the fraction of the total illumination intensity which the first projector contributes to at the corresponding position on the projection surface in a projection of a uniform and maximum intensity image from the first projector and the second projector, or in a projection of a uniform and maximum intensity image from each the first projector and the second projector, or in a projection of a uniform and maximum intensity image from the first projector, or in a projection of a uniform and maximum intensity image from the second projector.

The threshold value for each pixel of the plurality of pixels may be derived by dividing the total illumination intensity, which the first projector contributes to at the corresponding position on the projection surface by the combined total illumination intensity from each of the first projector and the second projector at the corresponding position in a projection of a uniform and maximum intensity image.

The method according to the first aspect of the present invention may further comprise:
(p) adjusting the temporary image to include an alignment pattern.

The method according to the first aspect of the present invention may further comprise:
(q) providing the alignment pattern,
(r) adjusting the temporary image by adding the alignment pattern to the temporary image,
(s) adjusting the temporary image by a process equivalent to: (vi.i) determining a fourth minimum value as the minimum of the temporary value and its corresponding source value for each pixel, and (vi.ii) adjusting the temporary value to the fourth minimum value for each pixel.

The alignment pattern may comprise a grid, a mesh, a barcode, and/or a semacode, and alternatively or additionally the alignment pattern comprising a regular pattern of elements, and/or an irregular pattern of elements, and alternatively or additionally the alignment pattern comprising a regular pattern of dots and/or cross hairs, and/or an irregular pattern of elements of dots and/or cross hairs.

The above objects are according to a second aspect of the present invention met by a method for double stacking a first output image and a second output image on a projection surface by a first projector and a second projector, the method comprising:
(aa) positioning and orienting the first projector and the second projector for overlaying the first output image and the second output image on the projection surface,
(ab) producing the first output image and the second output image by the method according to the first aspect of the present invention,
(ac) supplying the first output image and the second output image to the first projector and the second projector, respectively, and
(ad) projecting the first output image and the second output image by the first projector and the second projector, respectively.

The first projector and the second projector may generate a superimposed image on the projection surface. The method according to the second aspect of the present invention may further comprise:
(ae) recording a first captured image of the superimposed image,
(af) determining a first contribution of the first projector to the first captured image,
(ag) generating a first feedback image from the first contribution,
(ah) generating a first set of misalignment vectors from the first feedback image and the first output image by a feature tracking and/or feature matching,
(ai) generating a first warped image of the first captured image by a first warping comprising the first set of misalignment vectors,
(aj) generating a second feedback image by subtracting the first output image from the first warped image,
(ak) generating a second set of misalignment vectors from the second feedback image and the second output image by a feature tracking and/or feature matching,
(al) generating a third set of misalignment vectors from the first set of misalignment vectors and the second set of misalignment vectors, and
(am) deriving a first geometric correction of the first output image and/or the second output image from the third set of misalignment vectors.

Determining the first contribution of the first projector may comprise a high pass filtering of the first captured image.

The above objects are according to a third aspect of the present invention met by a method for deriving a correction of a double stacking of a first output image and a second output image on a projection surface by a first projector and a second projector, the method comprising:
(ba) positioning and orienting the first projector and the second projector for overlaying the first output image and the second output image on the projection surface,
(bb) producing a first output for a first source image, the first output comprising the first output image and the second output image produced by the method according to an example of the first aspect of the present invention including an alignment pattern for the first source image,
(bc) supplying the first output image and the second output image of the first output to the first projector and the second projector, respectively, and
(bd) projecting the first output image and the second output image of the first output by the first projector and the second projector, respectively, on the projection surface,
(be) recording a first captured image comprising the first output image and the second output image of the first output projected on the projection surface,
(bf) detecting a contribution of the misalignment pattern of the first output in the first captured image
(bg) deriving a geometric correction for the second output image from the detected contribution of the misalignment pattern of the first output.

The method according the second aspect of the present invention may further comprise:
(bh) producing a second output for a second source image for being displayed subsequent to the first source image, the second output comprising the first output image and the second output image produced by the method according to an example of the first aspect of the present invention including an alignment pattern for the second source image,
(bi) supplying the second output image and the second output image of the second output to the first projector and the second projector, respectively, and
(bj) projecting the second output image and the second output image of the second output by the first projector and the second projector, respectively, on the projection surface,
(bk) recording a second captured image comprising the first output image and the second output image of the second output projected on the projection surface,
(bl) detecting a contribution of the misalignment pattern of the second output in the second captured image,
(bm) deriving a geometric correction for the second output image from the detected contribution of the misalignment pattern of the second output.

The method according the second aspect of the present invention may further comprise:
(bh) producing a second output for a second source image for being displayed subsequent to the first source image, the second output comprising the first output image and the second output image produced by the method according to an example of the first aspect of the present invention including an alignment pattern for the second source image,
(bi) supplying the second output image and the second output image of the second output to the first projector and the second projector, respectively, and
(bj) projecting the second output image and the second output image of the second output by the first projector and the second projector, respectively, on the projection surface,
(bk) recording the first captured image comprising the first output image and the second output image of the second output projected on the projection surface,
(bl) detecting a contribution of the misalignment pattern of the first output in the first captured image further comprising detecting a contribution of the misalignment pattern of the second output in the first captured image,
(bm) deriving a geometric correction for the second output image from the detected contribution of the misalignment pattern of the first output and the second output.

Detecting a contribution of the misalignment pattern of the first output in the first captured image and detecting the contribution of the misalignment pattern of the second output in the second captured image may further comprise a time averaging of the first captured image and the second captured image. Detecting of a contribution of the misalignment pattern of the first output and the second output may comprise high pass filtering.

The misalignment pattern of the first output and the misalignment pattern of the second output may be the same. The misalignment pattern of the first output and the misalignment pattern of the second output may be different. The misalignment pattern of the second output may be generated from the misalignment pattern of the first output. The misalignment pattern of the second output and the misalignment pattern of the first output may be generated by a cyclic function, the cyclic function being periodic as a function of time.

The above objects are according to a fourth aspect of the present invention met by a method for producing a first output image and a second output image of a first colour for being projected by a first projector and a second projector, and for producing a first output image and a second output image of a second colour for being projected by the first projector and the second projector, the method comprising:
(ca) producing the first output image and the second output image of the first colour by the method according to the first aspect of the present invention, and
(cb) producing the first output image and the second output image of the second colour by the method according to the first aspect of the present invention.

The above objects are according to a fifth aspect of the present invention met by a method for producing a first output image and a second output image of a first colour for being projected by a first projector and a second projector for projecting the first colour, and for producing and a first output image and a second output image of a second colour for being projected by a first projector and a second projector for projecting the second colour, the method comprising:
(ca) producing the first output image and the second output image of the first colour by the method according to the first aspect of the present invention, and
(cb) producing the first output image and the second output image of the second colour by the method according to an example of the first aspect of the present invention including an alignment pattern.

The first colour and the second colour may represent the left and right colours of stereoscopic image. The first colour and the second colour may represent two colours of a colour model, for example the RGB colour model.

In the fourth and fifth aspects of the present invention, the producing of the first output image and the second output image of the first colour may be performed by the method according to an example of the first aspect of the present invention including an alignment pattern. The first colour may represent shorter light wavelengths than the second colour. The first colour may represent blue and the second colour may represent green, yellow, or red.

The producing of the first output image and the second output image of the second colour may be performed by the method according to an example of the first aspect of the present invention including an alignment pattern the alignment pattern in producing the first output image and the second output image of the first colour and the alignment pattern in producing the first output image and the second output image of the second colour may have the same or approximately the same shape. The alignment pattern in producing the first output image and the second output image of the first colour and the alignment pattern in producing the first output image and the second output image of the second colour may have the same or approximately the same dimensions.

The method according to the fourth aspect of the present invention may further be adapted for producing a first output image and a second output image of a third colour for being projected by the first projector and the second projector, the method may further comprise:
(cc) producing the first output image and the second output image of the third colour by the method according to the first aspect of the present invention.

The first colour, the second colour, and the third colour may represent three colours of a colour model, for example the RGB colour model.

The method according to the fourth and fifth aspect of the present invention may further be adapted for producing a first output image and a second output image of a third colour for being projected by a first projector and a second projector for projecting the third colour, the method may further comprise:
(cc) producing the first output image and the second output image of the third colour by the method according to the first aspect of the present invention.

A first source value of a first pixel of the source image may represent the first colour, a second source value of a second pixel of the source image may represent the second colour, and a third source value of a third pixel of the source image may represent the third colour, the colours of the first, second and third pixels may define a second hue; a first intermediate value may be the intermediate value of the first pixel, a second intermediate value may be the intermediate value of the second pixel, and a third intermediate value may be the intermediate value of the third pixel defining a third hue, the method may further comprise:
(cd) subjecting the first, second, and third intermediate values to a colour adjustment.

The colour adjustment may be adapted for adjusting the first, second, and third intermediate values to define the third hue being equal to or approximately equal to the second hue. The colour adjustment may be equivalent to: (vii.i) calculating a first fraction as the first intermediate value divided by the first source value, (vii.ii) calculating a second fraction as the second intermediate value divided by the second source value, (vii.iii) calculating a third fraction as the third intermediate value divided by the third source value, (vii.iv) calculating a second maximum value as the maximum of the first, second, and third fractions, (vii.v) replacing the first intermediate value by the first source value multiplied by the second maximum value, (vii.vi) replacing the second intermediate value by the second source value multiplied by the second maximum value, and (vii.vii) replacing the third intermediate value by the third source value multiplied by the second maximum value.

The above objects are according to a sixth aspect of the present invention met by a system for producing a first output image and a second output image for being projected by a first projector and a second projector, respectively, the system comprising a computer and/or one or more circuits for performing the method according to the first aspect of the present invention. The system according to the sixth aspect of the present invention may further comprise an image source for providing the source image according to the first aspect of the present invention.

The above objects are according to a seventh aspect of the present invention met by a system for double stacking a first output image and a second output image, the system comprising a first projector, a second projector, and a computer and/or one or more circuits for performing the method according to the second aspect of the present invention. The system according to the seventh aspect of the present invention may further comprise an image source for providing the source image according to the second aspect of the present invention. The system according to the seventh aspect of the present invention may further comprise a camera for recording the first captured image of the superimposed image the second aspect of the present invention.

The above objects are according to an eighth aspect of the present invention met by a system for deriving a correction of a double stacking of a first output image and a second output image, the system comprising a first projector, a second projector, and a computer and/or one or more circuits for performing the method according to the third aspect of the present invention, the system further comprising a camera for recording the second captured image of the superimposed image.

The above objects are according to an ninth aspect of the present invention met by a system for producing a first output image and a second output image of a first colour for being projected by a first projector and a second projector and a first output image and a second output image of a second colour for being projected by the first projector and the second projector, the system comprising a computer and/or one or more circuits for performing the method according to the fifth and/or the sixth aspect of the present invention.

The above objects are according to a tenth aspect of the present invention met by a system for producing a first output image and a second output image of a first colour for being projected by a first projector and a second projector for projecting the first colour and a first output image and a second output image of a second colour for being projected by a first projector and a second projector for projecting the second colour, the system comprising a computer and/or one or more circuits for performing the method according to the fifth aspect of the present invention.

The above objects are according to an eleventh aspect of the present invention met by a projection system comprising a first projector and a second projector, the first projector comprising: a first lamp, a first integrating rod having an input end and an output end, the first integrating rod being configured for receiving light from the first lamp through the input end and generate a uniform illumination at the output end, a first projector filter configured to filter the uniform illumination at the output end of the integrating rod, a first spatial light modulator chip, a first illumination system for imaging the first projector filter on the light modulator chip, a first exit pupil through which light from the a first spatial light modulator chip exits the first projector; the second projector comprising: a second integrating rod having an input end and an output end, the second integrating rod being configured for receiving light from the second lamp through the input end and generate a uniform illumination at the output end, a second projector filter configured to filter the uniform illumination at the output end of the integrating rod, a second spatial light modulator chip, a second illumination system for imaging the second projector filter on the light modulator chip, a second exit pupil through which light from the a second spatial light modulator chip exits the second projector, the first projector filter being configured to wavelength shift the light exiting through the first exit pupil, and the second projector filter being configured to wavelength shift the light exiting the through the second exit pupil.

The first projector filter may define a first pass band and a first guard band, and the second projector filter may define a second pass band not overlapping the first pass band, and a second guard band may overlap the first guard band.

The first projector filter may define a first band stop and the first projector may further comprise: a first auxiliary filter configured to filter the uniform illumination from the output end of the first integrating and defining a first pass band and a first guard band, and the first band stop may match or approximately match the first guard band; and the second projector filter may define a second pass band not overlapping the first pass band and a second guard band overlapping the first guard band.

The first projector filter may define a first band stop and the first projector may further comprise: a first auxiliary filter configured to filter the uniform illumination from the output end of the first integrating and defining a first pass band and a first guard band, and the first band stop may match or approximately match the first guard band, and the second projector filter may define a second band stop; and the second projector may further comprise: a second auxiliary filter configured to filter the uniform illumination from the output end of the second integrating and defining a second pass band not overlapping the first pass band and a second guard band overlapping the first guard band, and the second band stop may match or approximately match the second guard band.

The second auxiliary filter may be flat and may have a second uniform thickness. The first auxiliary filter may be flat and may have a first uniform thickness.

The first projector filter may define a first uniform thickness and/or the second projector filter may define a second uniform thickness. The first projector filter may have a first varying thickness and/or the second projector filter may have a second varying thickness. The first projector filter may define a first curvature and/or the second projector filter may define a second curvature. The first projector filter may define a first flat area in a first central portion of the first projector filter, and/or the second projector filter may define a second flat area in a second central portion of the second projector filter. The first projector filter may define a first curved shape in a first peripheral portion of the first projector filter, and/or the second projector filter may define a second curved shape in a second peripheral portion of the second projector filter. The first projector filter may rest on a first transparent substrate, preferably a first glass substrate, and/or the second projector filter may rest on a second transparent substrate, preferably a second glass substrate. The first projector filter may be dichroic, and/or the second projector filter may be dichroic.

The first projector filter may be located at the output end of the first integrating rod and/or the second projector filter may be located at the output end of the second integrating rod. The first integrating rod may defining a first aperture having a first width at the output end and the first projector filter may define a first spherical surface having a first radius equal to or approximately equal to the first width, and/or the second integrating rod may define a second aperture having a second width at the output end and the second projector filter may define a second spherical surface having a second radius equal to or approximately equal to the second width.

The above objects are according to an twelfth aspect of the present invention met by a system for producing a series of three-dimensional images comprising: a computer and/or one or more circuits for producing left output comprising first output images and second output images by repeatedly applying the method according to the first aspect of the present invention, and the computer and/or the one or more circuits further being adapted for producing right output comprising first output images and second output images by repeatedly applying the method according to the first aspect of the present invention, the left output representing left perspective images of the series three-dimensional images and the right output representing corresponding right perspective images of the series three-dimensional images; a projection screen; a left perspective first projector coupled to the computer and/or one or more circuits and configured for projecting the first output images of the left output on the projection screen; a right perspective first projector coupled to the computer and/or one or more circuits and configured for projecting the first output images of the right output on the projection screen; and a left/right perspective second projector coupled to the computer and/or one or more circuits and configured for alternatingly projecting the second output images of the left output and the second output images of the right output on the projection screen.

The above objects are according to an twelfth aspect of the present invention met by a system for producing a series of three-dimensional images comprising: a computer and/or one or more circuits for producing left output comprising first output images and second output images by repeatedly applying the method according to the first aspect of the present invention, and the computer and/or the one or more circuits further being adapted for producing right output comprising first output images and second output images by repeatedly applying the method according to the first aspect of the present invention, the left output representing left perspective images of the series three-dimensional images and the right output representing corresponding right perspective images of the series three-dimensional images; a projection screen; a left perspective first projector coupled to the computer and/or one or more circuits and configured for projecting the first output images of the left output on the projection screen; a right perspective first projector coupled to the computer and/or one or more circuits and configured for projecting the first output images of the right output on the projection screen; a left perspective second projector coupled to the computer and/or one or more circuits and configured for projecting the second output images of the left output the projection screen; and a right perspective second projector coupled to the computer and/or one or more circuits and configured for projecting the second output images of the right output on the projection screen.

In the twelfth aspect and/or thirteenth aspect the left perspective first projector may comprise a left polarization filter for polarizing light projected by the left perspective first projector and the right perspective first projector may comprise a right polarization filter for polarizing light projected by the right perspective first projector.

The left polarization filter and the right polarization filter may have orthogonal or approximately orthogonal polarization directions. The left polarization filter and the right polarization filter may have opposite circular polarization directions. The projection screen may be being non-depolarizing. The systems according the twelfth aspect and/or thirteenth aspect may further comprise a temporal varying polarization unit.

BRIEF DESCRIPTION OF THE FIGURES

A multitude of embodiments of the different aspects of the present invention are depicted in the figures, where.

DESCRIPTION OF THE INVENTION

The present invention is described below in terms of exemplary configurations but is not intended to be regarded as limited to those. For the sake of explanation, greyscale projection systems are used to describe the present invention, whereas the configurations described may as well be applied to each of the colour planes of a tri-stimulus (for example RGB) colour projection system, and, using standard colour space conversion techniques, further be used for projection systems using other colour spaces (for example YPbPr). Further, colour correction circuits for adapting for example hue adjustment, black points and white points etc. between source image signals and projectors may obviously be included. Still, image projection systems are used in several descriptions, whereas the described configurations may as well operate on a sequence of still images constituting a moving image. Monoscopic projection systems are used in the description, but the invention may as well apply to a set of projection systems used for stereoscopic applications or to active stereoscopic projectors with separate left eye and right eye inputs or with double frame rate inputs. Pixel values are described as being in the range from 0 to 1, whereas in practical implementations other ranges will likely be chosen. Operations are described as being performed by separate circuits, whereas in practical implementation they will likely be implemented as software algorithms, lookup tables etc. in computer memory or graphics card memory. Further modifications, additions and alternative configurations obvious to a person skilled in the art are intended to be included in the scope of the invention.

Figure 1:
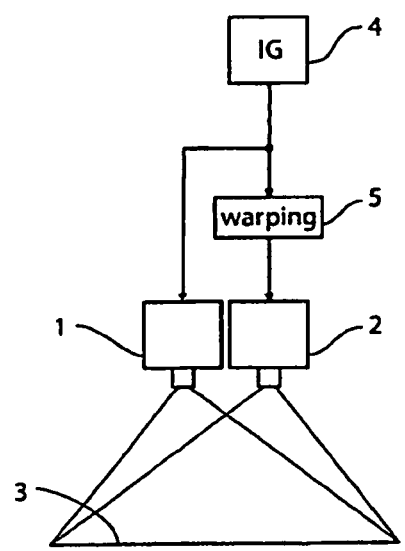
FIG. 1 illustrates an example of the prior art.

FIG. 1 shows a schematic view of a configuration of prior art, a traditional double stacking comprising essentially identical projectors, a first projector 1 and a second projector 2, each projecting an image onto a projection surface 3 and each having a decoding gamma function corresponding to the encoding gamma of an image generator 4, which is outputting a source image signal comprising an array of pixel values. The connecting lines in the schematic view illustrate image signal paths. The output of the image generator is supplied to the input of the first projector 1 and to the input of a warping circuit 5. The output of the warping circuit 5 is supplied to the input of the second projector 2. The warping circuit 5 performs a geometrical correction of the image projected by the second projector 2 to align it with the image projected by projector 1 and compensate for mechanical misalignment between projected images. Repeated re-calibrations may be needed to compensate for movements in mechanical and optical parts due to thermal variations etc.

Figure 2:
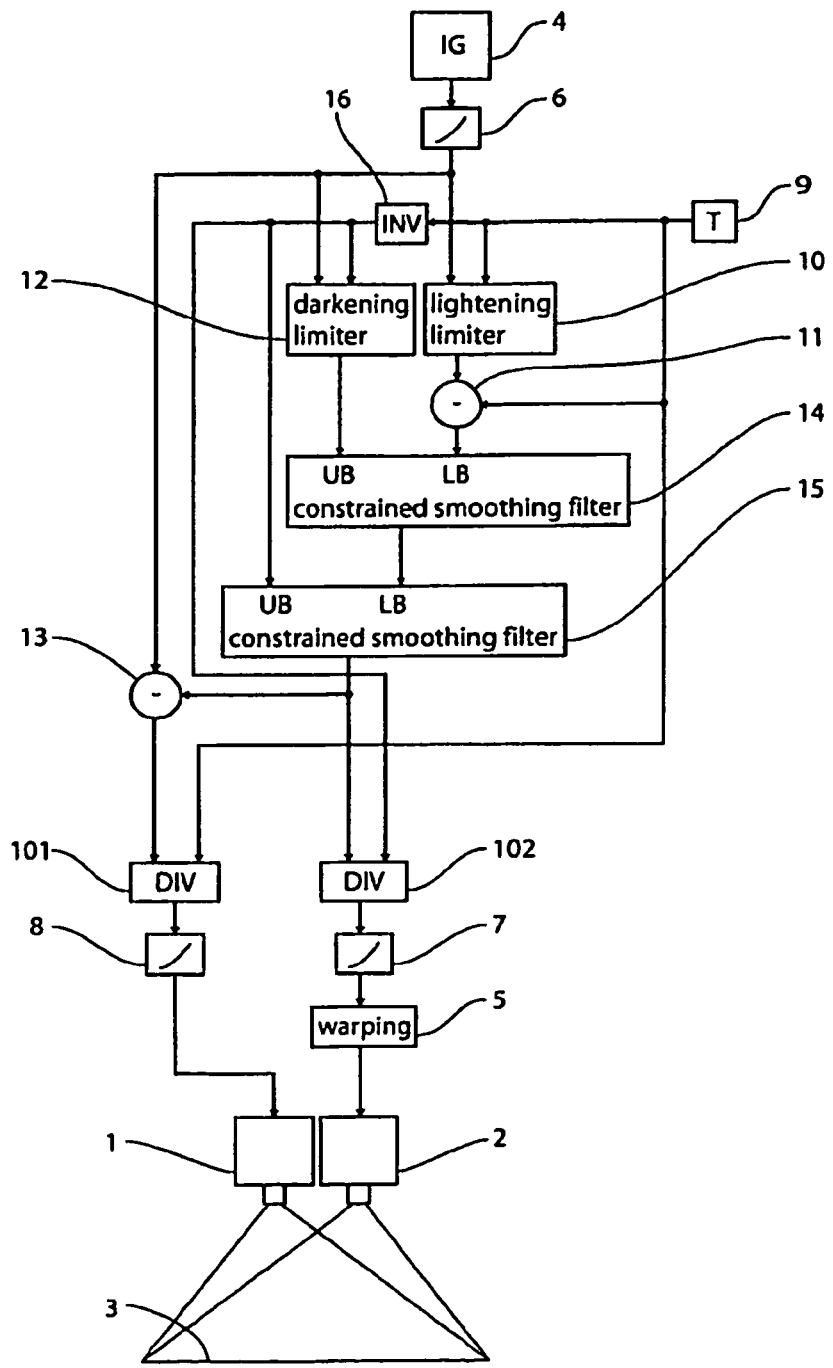
FIG. 2 illustrates a preferred embodiment of the present invention.

FIG. 2 shows a schematic view of a first embodiment of the invention. To the configuration of FIG. 1 has been added an image splitting function comprising a gamma decoding circuit 6, a first gamma encoding circuit 7, a second gamma encoding circuit 8, an image buffer 9, a lightening image limiter 10, a first image subtraction circuit 11, a darkening image limiter 12, a second image subtraction circuit 13, a first constrained smoothing filter 14, a second constrained smoothing filter 15, an image inversion circuit 16, a first image division circuit 101 and a second image division circuit 102, all connected as shown in the figure.

The gamma decoding circuit 6 is matched to the encoding gamma of the image generator 4, the first gamma encoding circuit 7 is matched to the decoding gamma of the second projector 2 and the second gamma encoding circuit 8 is matched to the decoding gamma of the first projector 1. Thus, all operations in the circuit between the output of gamma decoding circuit 6, the first gamma encoding circuit 7 and the second gamma encoding circuit 8 are performed at a gamma of unity, meaning that pixel values represent linear intensities, and the resulting superimposed illumination intensity in a point of the projection surface 3 is a function of the sum of the corresponding pixel values in the images being input to the first gamma encoding circuit 7 and to the second gamma encoding circuit 8.

The image buffer 9 stores a threshold image T which holds for each pixel value a representation of the fraction of illumination intensity which the first projector 1 is contributing to the corresponding position on the projection surface 3 when both projectors are supplied uniform, maximum intensity images to their inputs. Since in this embodiment the first projector 1 and the second projector 2 are essentially identical, the first projector 1 contributes half the illumination intensity in all positions, and all pixel values in T are 0.5. In an alternative configuration of this embodiment, the projectors are not identical but have different spatial distribution of their maximum illumination intensities; hence T is an image having pixels with varying values between 0 and 1.

The content T of the image buffer 9 and the output of the gamma decoding circuit 6 are supplied to the lightening limiter 10. The lightening image limiter 10 calculates an image that in every pixel position is the higher of the two inputs and it outputs the result to the first image subtraction circuit 11, which subtracts T and supplies the result to a lower bound image input LB of the constrained smoothing filter 14. The pixel values of this image represents the amount of intensity that the first projector 1 is not capable of reproducing alone, hence the minimum intensity the second projector 2 should contribute in the corresponding pixel position.

The content T of the image buffer 9 is supplied to the image inversion circuit 16 and the output of the image inversion circuit 16 is supplied to the darkening image limiter 12. Further, the output of the gamma decoding circuit 6 is supplied to the darkening image limiter 12. The darkening image limiter 12 calculates an image that in every pixel position is the lower of the two inputs and outputs the result to an upper bound image input UB of the constrained smoothing filter 14. This image represents the maximum intensity the second projector 2 should contribute, i.e. the desired resulting pixel intensities limited by the maximum intensity the second projector is able to contribute in the corresponding pixel position.

Figure 3:
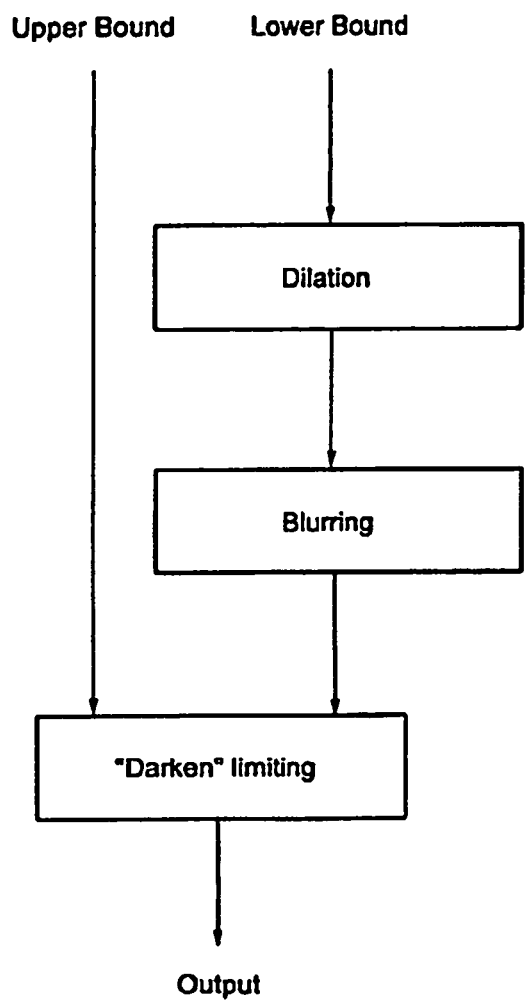
FIG. 3 illustrates details of the preferred embodiment.

The first constrained smoothing filter 14 calculates a generally smooth, blurry output image with only few high frequency components and where the output image is essentially constrained in any pixel position to have a pixel value in the range from the corresponding pixel value in the lower bound image LB and the corresponding pixel value in the upper bound image. FIG. 3 shows a process flowchart of an exemplary configuration of the constrained smoothing filter 14. The constrained smoothing filter 14 performs a greyscale dilation operation with a dilation radius r1 on the lower bound input image LB followed by a blur operation with a blur radius r1' smaller than or equal to r1 on the result of the greyscale dilation operation, followed by a darkening image limiting operation with the upper bound input image UB on the result of the blur operation, limiting pixel values in the result of the blur operation to be smaller than or equal to the corresponding pixel values in the upper bound input image UB and the result of the darkening image limiting operation is the output of the first constrained smoothing filter. Alternatively, the darkening image limiting operation may be omitted and the result of the blur operation may be the output of the first constrained smoothing filter. The dilation radius r1 may be 4 pixels and the blur radius r1' may be equal to r1. Alternatively, the dilation radius r1 may be $1/300^{th}$ of the width of the lower bound input image LB and the blur radius r1' may be equal to r1. The blur operation may be a Gaussian blur operation which may have a standard deviation of $1/3*r1'$ or the blur operation may be a mean filtering operation. In alternative configurations, the first constrained smoothing filter 14 may comprise a spline based or membrane based envelope filter or a glow effect filter.

The output of the first constrained smoothing filter 14 is supplied to a lower bound input of a second constrained smoothing filter 15 and the output of the image inversion circuit 16 is supplied to an upper bound input of the second constrained smoothing filter 15. The second constrained smoothing filter 15 may perform an operation similar to that of the first constrained smoothing filter 14 with a dilation radius r2 and a blur radius r2'. The dilation radius r2 may be 2 pixels and the blur radius r2' may be equal to r2. Alternatively the dilation radius r2 may be $1/600^{th}$ of the width of the lower bound input image of the second constrained smoothing filter 15 and the blur radius r2' may be equal to r2. In an alternative configuration the second constrained smoothing filter 15 may be substituted by a blur filter. The dilation radius r2 of the second constrained smoothing filter 15 may be adjustable and the blur radius r2' may be set to follow r2 when adjusted. It is noted that when r2=0 and r2'=0, the output of the second constrained smoothening filter 15 is equal to the lower bound input, i.e. equal to the output of the first constrained smoothing filter 14.

The output of the gamma decoding circuit 6 and the output of the second constrained smoothing filter 15 are supplied to an image subtraction circuit 13 which calculates an image by subtracting the output of the second constrained smoothing filter 15 from the output of the gamma decoding circuit 6. The result of the subtraction is supplied to a first input of the first image division circuit 101. The output image T from the image buffer 9 is supplied to a second input of the first image division circuit 101. The first image division circuit 101 divides the first input by the second input and the result of the division is supplied to the input of the second gamma encoding circuit 8. Hence, the first image division circuit 101 scales pixel values in the output image of the second image subtraction circuit 13, which will be in the range from 0 to the corresponding pixel values of T, by dividing with the pixel values in T, so the resulting output pixel values are scaled to be in the range 0 to 1.

The output image of the second constrained smoothing filter 15 is further supplied to a first input of the second image division circuit 102 and the output of the image inversion circuit 16 is supplied to a second input of the second image division circuit 102. The second image division circuit 102 divides the first input by the second input and the result of the division is supplied to the input of the first gamma encoding circuit 7. Hence, the second image division circuit 102 scales pixel values in the output image of the second constrained smoothing filter 15, which will be in the range from 0 to the inverse of the corresponding pixel values of T, by dividing with the inverse of the pixel values in T, so the resulting output pixel values are scaled to be in the range 0 to 1.

The output of the first gamma encoding circuit 7 is supplied to the input of the warping circuit 5 and the output of the warping circuit 5 is supplied to the input of the second projector 2. The output of the second gamma encoding circuit 8 is supplied to the input of the first projector 1.

In an alternative, simplified configuration of the first embodiment, the darkening image limiter 12 may be omitted and a uniform, maximum intensity image may be supplied to the upper bound input of the first constrained smoothing filter 14.

Figure 4:
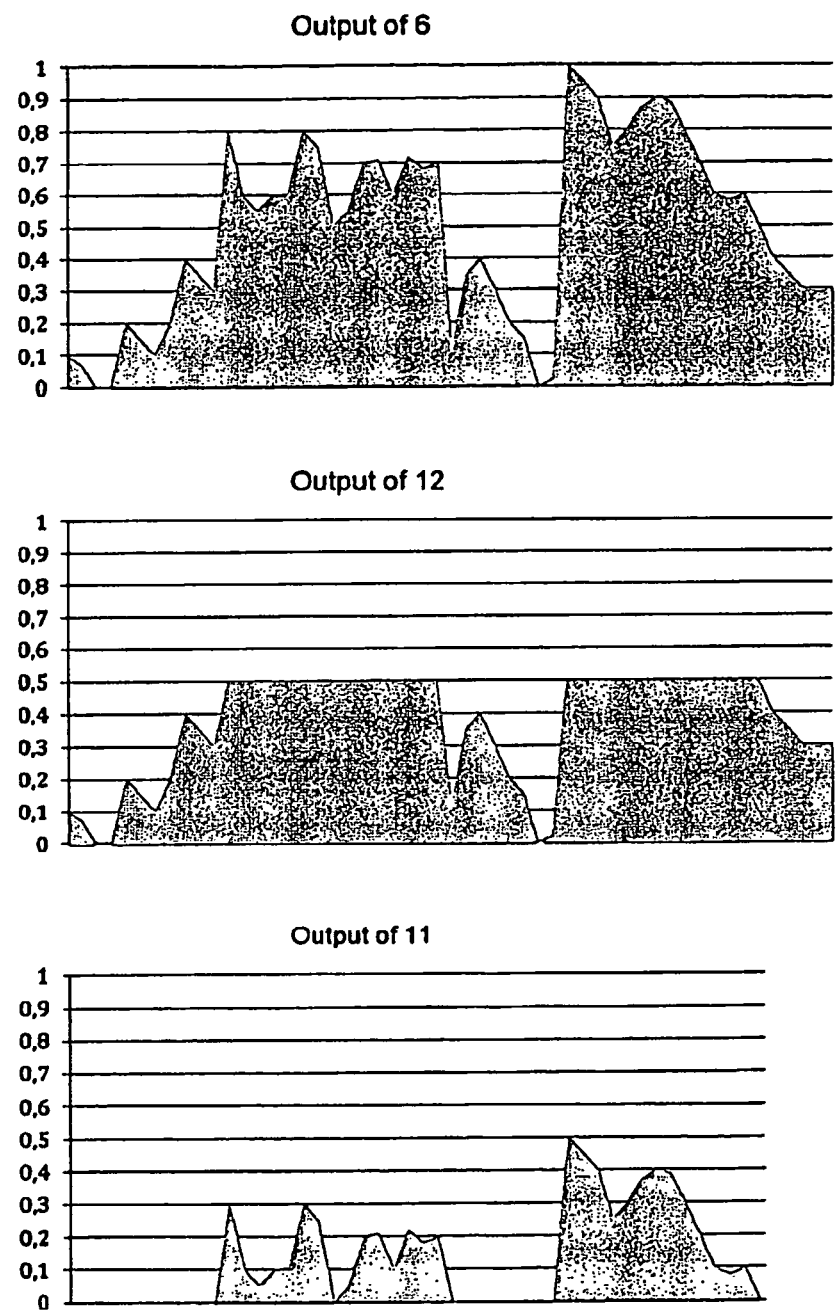
FIGS. 4-7 illustrate different pixel values generated in the preferred embodiment.

FIG. 4 shows graphs of values in an example section of a row of pixels at different stages of the processing, the first graph in FIG. 4 shows the output of the gamma decoding circuit 6, the second graph shows the output of the darkening limiter 12 and the third graph shows the output of the first image subtraction circuit 11.

Figure 5:
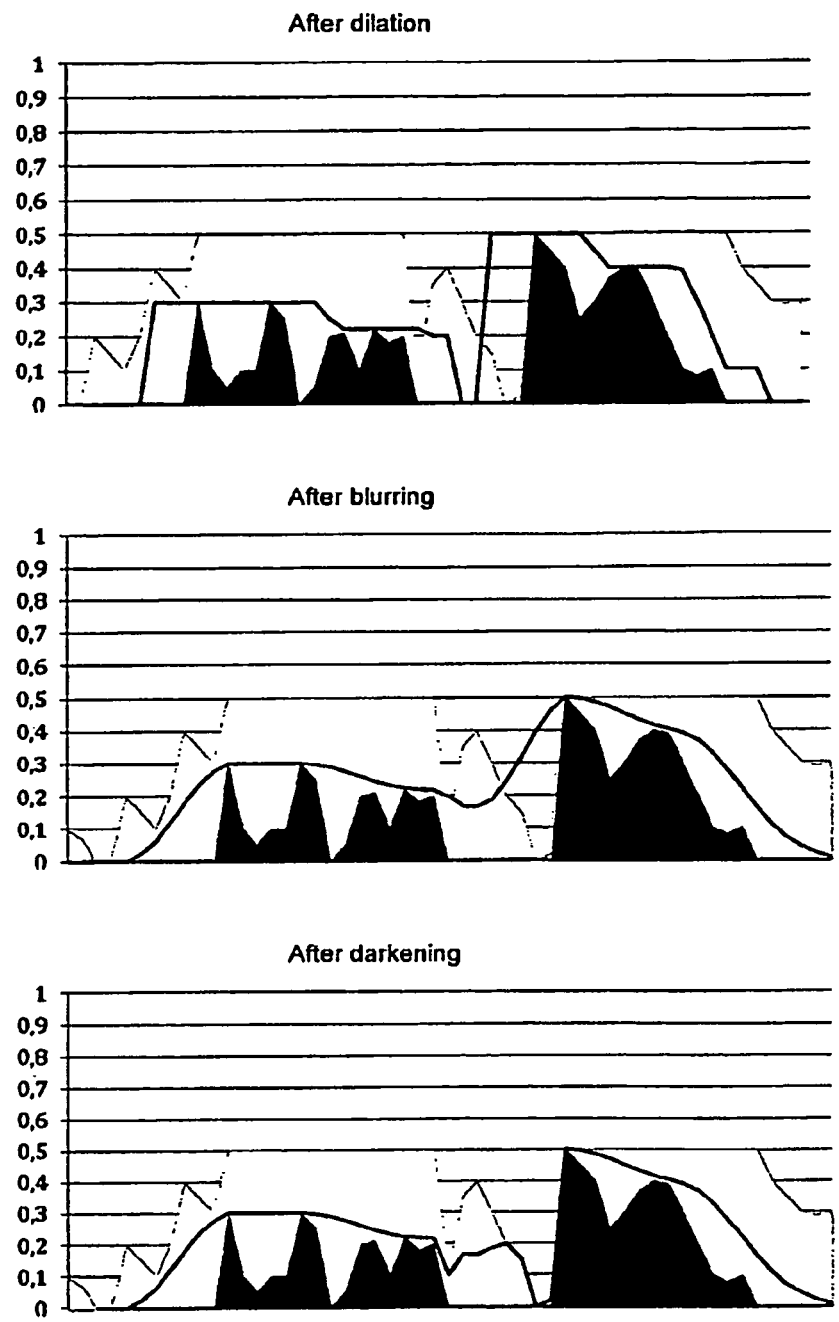

FIG. 5 shows three graphs of values in the example section of a row of pixels at different stages of an operation of the constrained smoothing filter 14 with a dilation radius r1 of 3 pixels and a blur radius r1' essentially equal to r1. In the first graph in FIG. 5 the result of the dilation operation is indicated as a black line with the lower bound input indicated in dark gray and the upper bound input indicated in light gray. The second graph shows in a similar manner the result of the blur operation and the third graph shows the result of the darkening operation.

Figure 6:
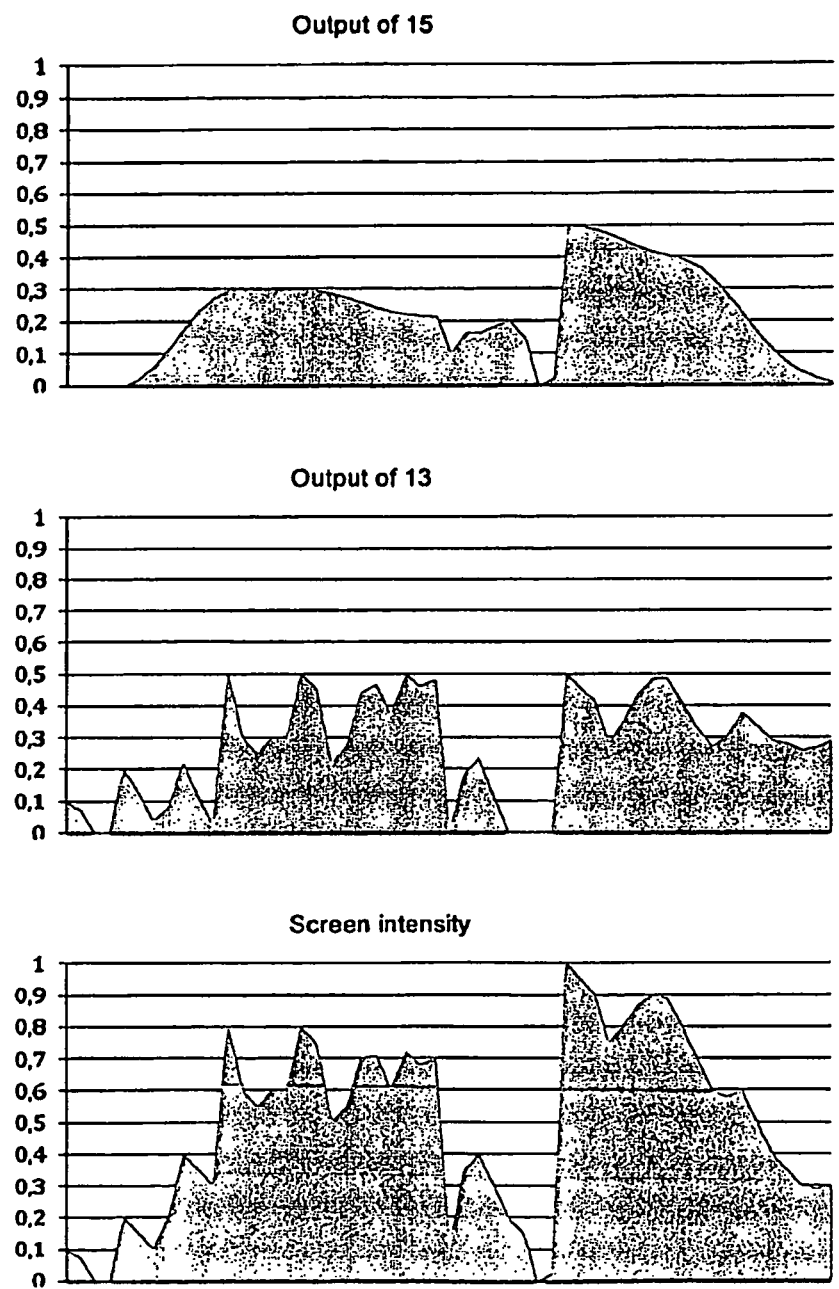

FIG. 6 shows 3 example graphs of the values in a row of pixels, the first graph in FIG. 6 shows the output of the second constrained smoothing filter 15 when r1=3 pixels and r2=0 and r1' is essentially equal to r1 and r2' is essentially equal to r2. The second graph shows the output of the image subtraction circuit 13 and the third graph shows summed values of the output of the second constrained smoothing filter 15 and the image subtraction circuit 13, which summed values, as noted above, trans-late directly to the resulting illumination intensity in the corresponding row of pixels on the projection surface 3 when alignment of the projected images is essentially perfect, because the operations are performed in a gamma of unity. When r2=0 as in this example, summation of the input images to the gamma encoding circuits is equal to the output of the gamma decoding circuit 6, which is the gamma decoded source image, hence, with perfect alignment of the projected images, the resulting image on the projection surface 3 corresponds essentially perfectly to the output of the image generator 4, a condition that can be referred to as a "perfect reconstruction". In an alternative configuration of this embodiment working in the "perfect reconstruction" condition only, the second constrained smoothing filter 15 may be omitted.

As the first graph in FIG. 6 shows, the amount of high spatial frequencies in the output of the second constrained smoothing filter 15 is significantly less than in the output image of the gamma decoding circuit 6, resulting in a generally smoother, blurred image being projected by the second projector 2 than in a traditional double stacking configuration.

A first advantage of the invention is that the smoother image of the second projector 2 reduces the visible artefacts introduced by a smaller misalignment of the projected images. In many cases, a misalignment of a full pixel or more is not noticeable, which in a traditional double stacking configuration would have introduced highly visible artefacts.

However, as can be seen on the first graph in FIG. 6, the output of the second constrained smoothing filter 15 is not completely eliminated high frequency components. At high contrast edges in the source image where the contrast is close to or above the contrast reproduction capability of the first projector 1, the upper bound and lower bound inputs to the first constrained smoothing filter 14 get so close, so it may not always be possible to create a smooth "curve" (or rather: surface) between them, and these areas of the projected image will be the most sensitive to misalignment. Setting r2 to a value higher than 0 will enforce a smoothing also in these areas, reducing spatial frequency components further and increase the misalignment tolerance. The cost of this increased misalignment tolerance is losing the ability of achieving "perfect reconstruction" and introducing small artefacts even at perfect alignment of the projected images, in the form of faint haloes around edges in the source image with a contrast higher than the first projector 1 is capable of reproducing. Hence, adjusting r2 defines a compromise between "perfect reconstruction" and "high misalignment tolerance".

Figure 7:
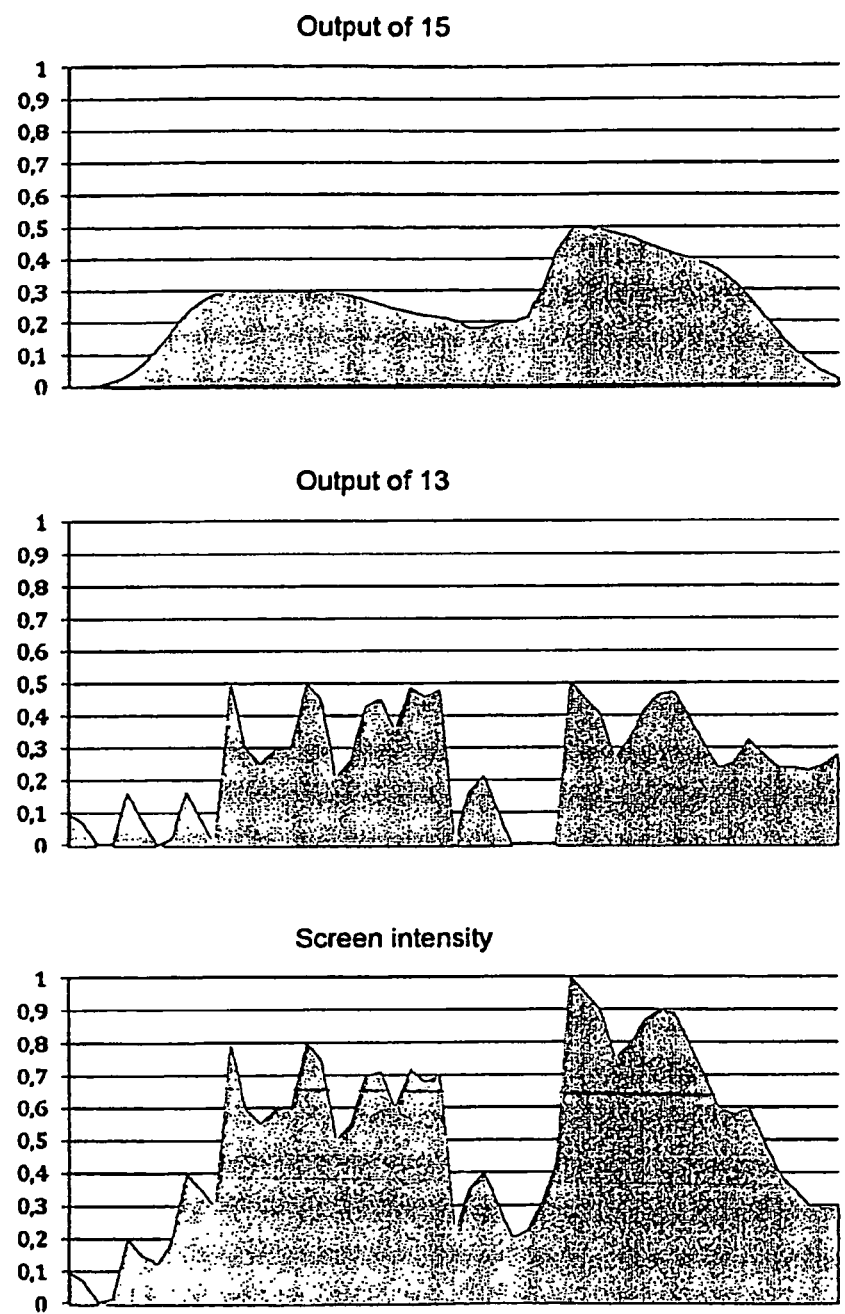

FIG. 7 is equivalent to FIG. 6, except that the dilation radius r2 is 2 pixels here and the blur radius r2' is essentially equal to r2. The dilation radius r1 is still 3 pixels and the blur radius r1' is still essentially equal to r1. The faint halo artefact is visible in the summed graph at the bottom just to the left of the highest peak. Fortunately, these artefacts may be unrecognizable for the Human Visual System in a projected image due to lateral inhibition in the neural response system on the retina (lateral masking), when r2 is below a limit determined by the overall projection system on-screen contrast, hence theoretical "perfect reconstruction" is not necessarily needed. Determining a good value for r2 for a given type of projection system may be performed by having a critical group of observers located in the front rows look at a test pattern containing maximum contrast edges and switch between random values of r2 and ask the group members to rate the images in terms of edge sharpness and then selecting the value of r2 where nobody notices the reduction of edge sharpness. It is noted that the reason for selecting the second constrained smoothing filter 15 also for the second filtering pass, as opposed to for example selecting a standard lowpass filter, is that this configuration preserves illumination intensity in small areas of highlights like reflections in water or leafs, which may be important visual clues that are not subject to suppression by lateral inhibition.

Figure 8:
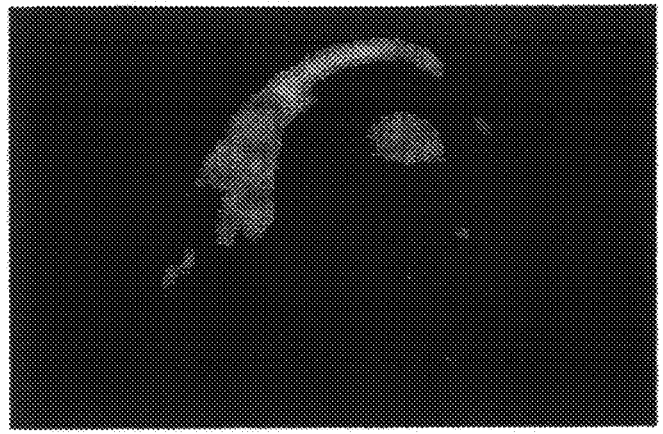
FIGS. 8-9 illustrate examples of different outputs of the preferred embodiment.
Figure 8:
Figure 8:

FIG. 8 shows printed images of an output of the second constrained smoothing filter 15 together with the output of the image subtraction circuit 13 and a simulation of the resulting projected overlaid image calculated by adding the output of the second constrained smoothing filter 15 and the output of the image subtraction circuit 13. (The images have here been applied a gamma so they are watchable on print).

Figure 9:
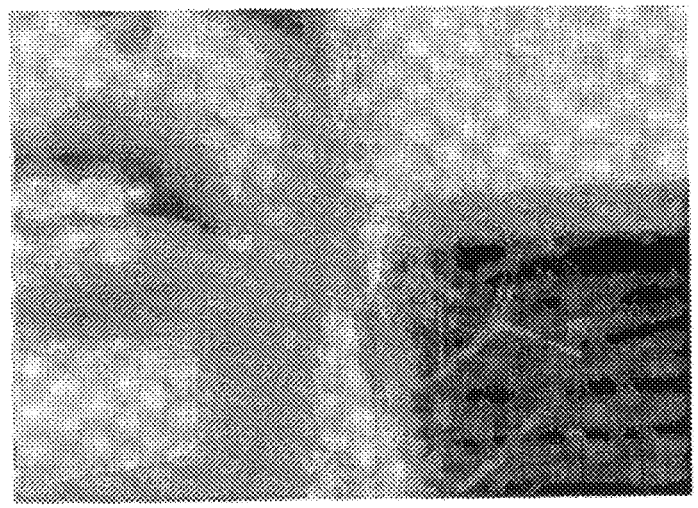
Figure 9:

FIG. 9 shows similar simulations of an enlarged section of an image projected with a 2 pixel misalignment. The upper image is a simulation of a projection with traditional double stacking and the lower image is a simulation of a projection with the first embodiment of the invention.

Figure 10:
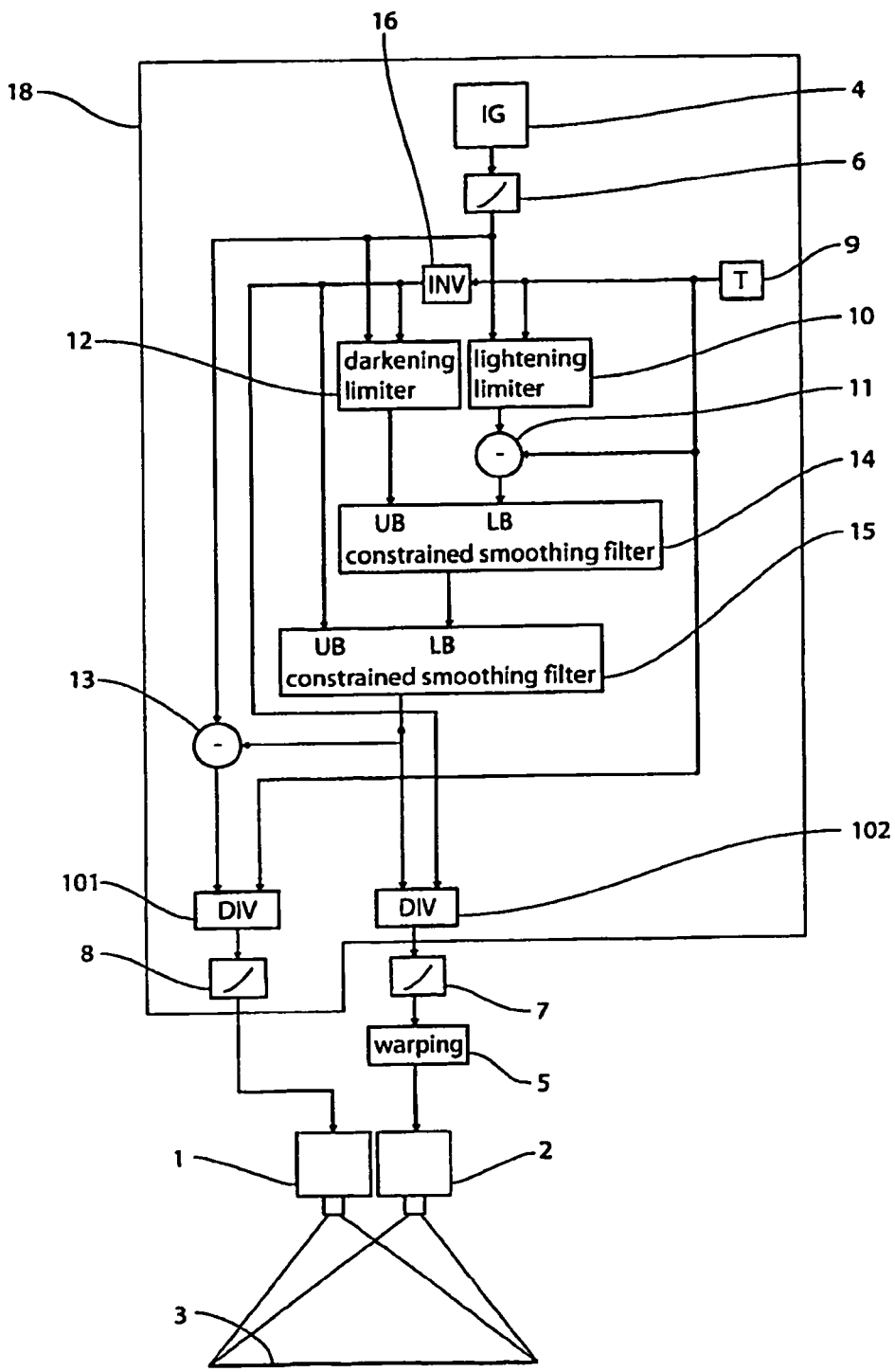
FIGS. 10-12 illustrate alternative embodiments of the present invention.
Figure 11:
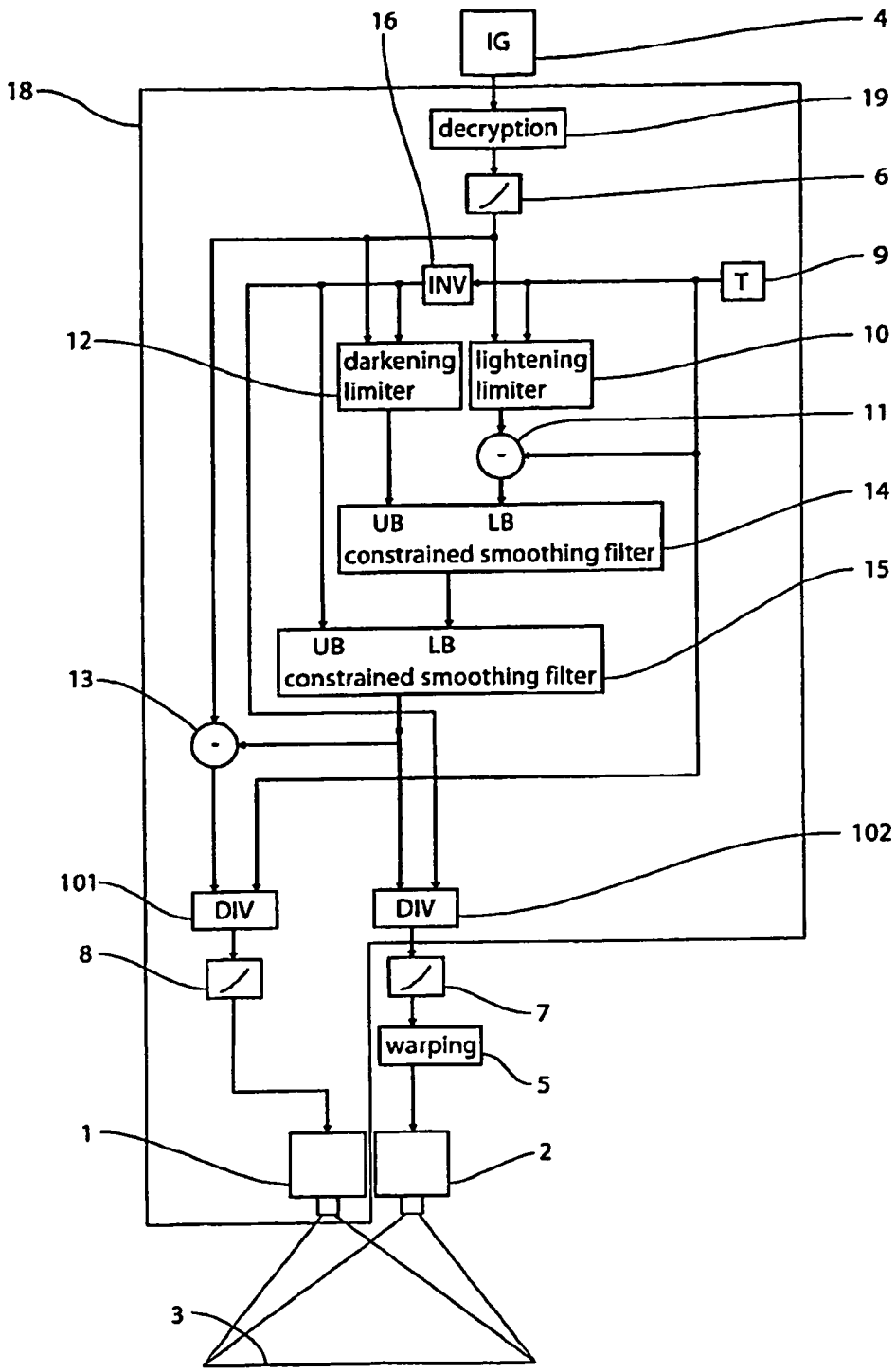
Figure 12:
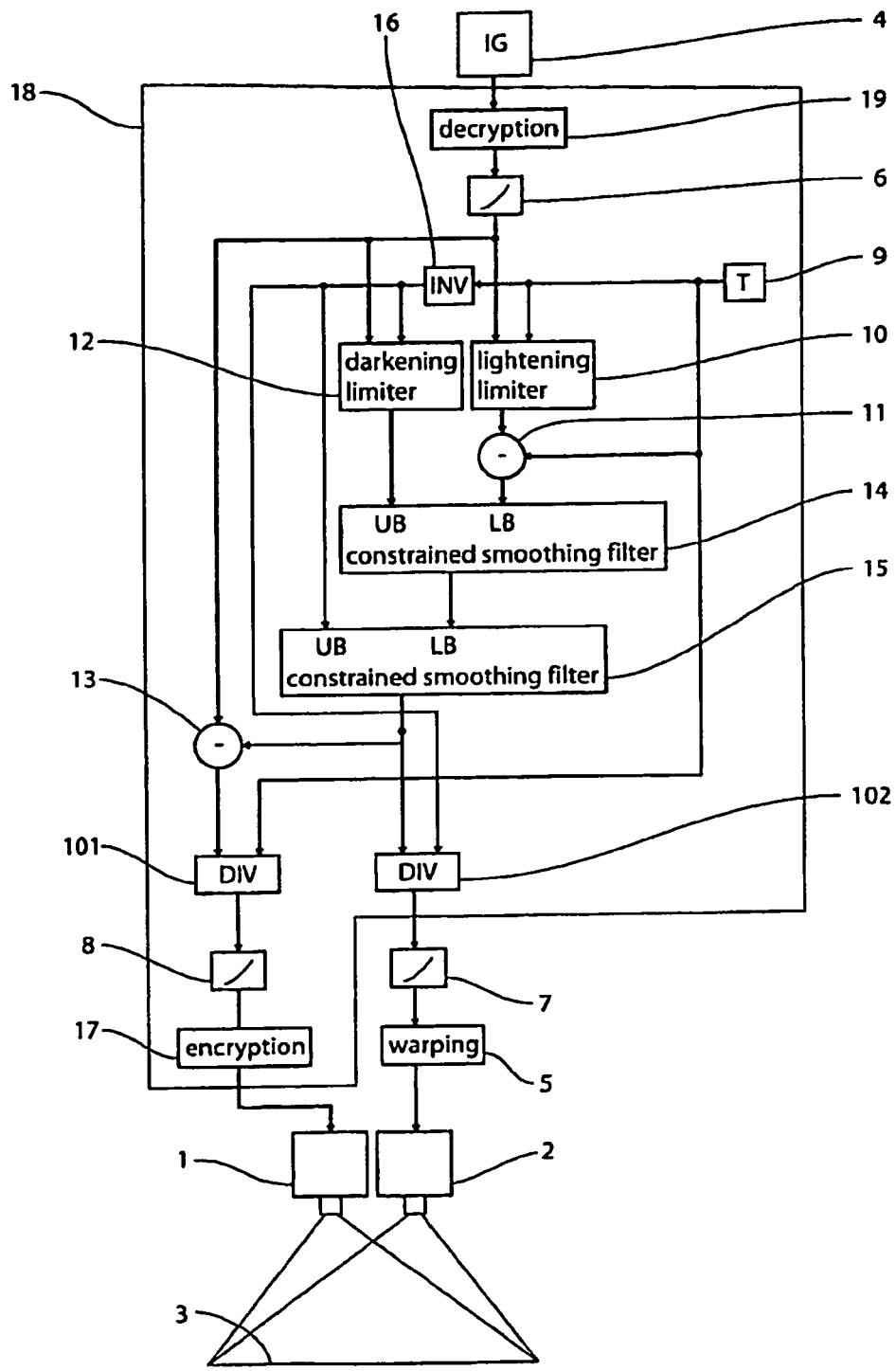

A second advantage of the invention is that the output image of the second constrained smoothing filter 15 will generally not be watchable and not hold enough detail information to be manipulated into a watchable image without additional information being supplied, meaning, that in copy-protected projection systems, where signal paths and image storages are subject to encryption and physical anti-tampering requirements, the whole signal path from the output of the second constrained smoothing filter 15 including the warping circuit 5 and the second projector 2 may not need to be encrypted or physically secured. FIG. 10 shows an example of including the first embodiment in a digital cinema server. An anti-tampering protective housing 18 encompasses the indicated components. The output of the second gamma encoding circuit 8 is supplied to an encryption circuit 17 and the first projector 1 is a digital cinema projector capable of decrypting the input image signal. FIG. 11 shows an example of including the first embodiment in a digital cinema projector. The image generator 4 may be a digital cinema server outputting an encrypted image signal, a decryption circuit 19 decrypts the signal and the anti-tampering housing 18 encompasses the indicated components. FIG. 12 shows an example of the first embodiment included in a stand-alone unit with an image decryption circuit 18 decrypting the encrypted output of the image generator 4 which may be a digital cinema server and an image encryption circuit 17 encrypting the image signal and outputting the encrypted signal to a digital cinema server capable of decrypting the image signal and the anti-tampering housing encompassing the indicated components. In the configurations of FIGS. 9, 10 and 11, the first gamma encoding circuit 7, the warping circuit 5 and the second projector 2 are outside the anti-tampering housing and process unencrypted signals, making the practical implementation relatively uncomplicated.

In an alternative configuration of the first embodiment, a resampling circuit may be included, which resamples the output image from the first gamma encoding circuit 7 to a lower spatial resolution and supplies the resulting resampled image to the warping circuit 5 and where the warping circuit and the second projector 2 have lower spatial resolution than the first projector 1. Since the output of the first gamma encoding circuit 7 contains little high frequency components, this may have only little or no effect on the resulting image quality.

Hence, a third advantage of the invention is that upgrade costs may be reduced and investments in existing equipment protected, for example in a theatre with a single 2K projector wishing to upgrade to 4K and increased brightness. In general, the relaxed requirements to the second projector 2 opens up possibilities for asymmetric configurations where the second projector 2 may be a completely different projection system than the first projector 1, having limitations that would not make it useful for traditional double stacking but are less significant in a configuration of the first embodiment, like lower resolution, slightly visible blending edges or brightness differences of a tiled system, not supporting encryption etc., but having other relevant advantages, such as good black level, being already installed or being optimised to serve specialized applications when not used as part of the first embodiment, such as conference presentations, planetarium star field projection etc.

In yet an alternative configuration of the first embodiment, an image erosion circuit is inserted between the output of the first constrained smoothing filter 14 and the lower bound input of the second constrained smoothing filter 15, where said image erosion circuit performs a greyscale erosion operation on the image signal received from the first constrained smoothing circuit 14. The radius R3 of the greyscale erosion operation may be 0.5 pixel or 1 pixel. This configuration presents the advantage that errors in actual on-screen pixel intensities due to misalignment may be shifted into brighter regions, where the same linear intensities will be less noticeable to the human eye due to the non-linear nature of the human visual system.

In yet an alternative configuration of the first embodiment, a colour correction circuit is inserted between the output of the first image subtraction circuit 11 and the lower bound input of the first constrained smoothing filter 14. Said colour correction circuit is further connected to the output of the gamma decoding circuit 6 and it adds to the pixel values in the image received from the first image subtraction circuit 11 in a way so that the pixels in the output to the first constrained smoothing filter 14 have essentially the same hue as the corresponding pixels in the image signal received from the gamma decoding circuit 6. This operation may be performed by, for each pixel calculating a constant K=Max(R11/R6, G11/G6, B11/B6), where (R6,G6,B6) is the pixel colour value of the output of the gamma decoding circuit 6 and (R11,G11,B11) is the pixel colour value of the output of the first image subtraction circuit 11 and where Max(x,y,z) denotes a function returning the highest of the values x, y and z, and by calculating the output pixel colour values R'=K*R6, G'=K*G6 and B'=K*B6, and outputting (R',G',B') to the lower bound input of the first constrained smoothing filter 14. In this configuration, pixel hues in the images projected from both projectors will be the same, which may in some images reduce the visibility of misalignment artefacts further.

In yet an alternative configuration of the first embodiment, the output signal from the first gamma encoding circuit 7 or from the resampling circuit is recorded on a first medium and the output of the second gamma encoding circuit 8 is encrypted and recorded on a second medium, and the first medium and the second medium are played back synchronously with the output of the first recording medium being supplied to the warping circuit 5 which is calibrated for alignment of the images and supplies the warped output to the second projector 2 and the output of the second medium being supplied to projector 1.

A fourth advantage of the invention is that it may reduce banding artefacts introduced by a traditional double stacking configuration, because it may have higher dynamic contrast resolution compared to that of a traditional double stacking system, since more different resulting intensities on said projection surface 3 is possible. In a traditional double stacking configuration where each projector has discrete intensity steps matched to the Just Noticeable Differences of the Human Visual System, the resulting overlaid image on the projection surface 3 may have discrete intensity steps exceeding the Just Noticeable Differences, which may result in visible banding.

A fifth advantage of the invention is that an automatic re-alignment system based on a digital image capturing system taking pictures of resulting superimposed image projected on the projection surface 3 may separate a captured image into components originating from each projector and perform recalibration of the warping circuit without the need for iterations over a sequence of frames in a public presentation or using special iterating training sequences. For example, a high frequency filtering of a captured image may create an image that is related only to the image being projected by the first projector 1 making it possible to do feature matching or tracking, identify a first set of misalignment vectors from the captured image with respect to the input image to the first projector 1 and warp the captured image so it is aligned with the first projector 1, and then subtract a gamma decoded version of the image being input to the first projector 1 from a gamma corrected and gain-corrected version of the captured image, resulting in an image that is related only to the image being projected by the second projector 2, so feature matching or tracking is possible and a second set of misalignment vectors between the captured image and the image being projected by the second projector 2 can be calculated, and from the first and second set of misalignment vectors calculate a third set of misalignment vectors, which is the misalignment vectors between the image being projected by the first projector 1 and the image being projected by the second projector 2 and from the third set of misalignment vectors perform a re-calibration of the warping circuit 5. Alternatively, in an RGB projection system, a single alignment image may be constructed which in one colour plane contains a geometric pattern, for example a grid, which has only pixel values above the values in the threshold image T and where another colour plane contains the same geometric pattern but with pixel values below the values in the threshold image T, thus for each pixel position it is possible to obtain relative misalignment vectors between the projectors and perform a re-calibration of the warping circuit 5.

Additionally, the first embodiment may be switchable to a single projector mode, in which one of the projectors is simply being supplied the source image. This single projector mode may act as fall-back operation in case of a projector failure and may be activated automatically by a detection system capable of detecting a projector failure, where the detection circuit may be an integrated part of the projector or where the detection circuit may be based on a digital image capture system taking pictures of the resulting superimposed image being projected on the projection surface 3, resulting in a degree of redundancy, where, for example in the case that a lamp blows, the system will continue to project correct images albeit with less brightness.

Figure 18:
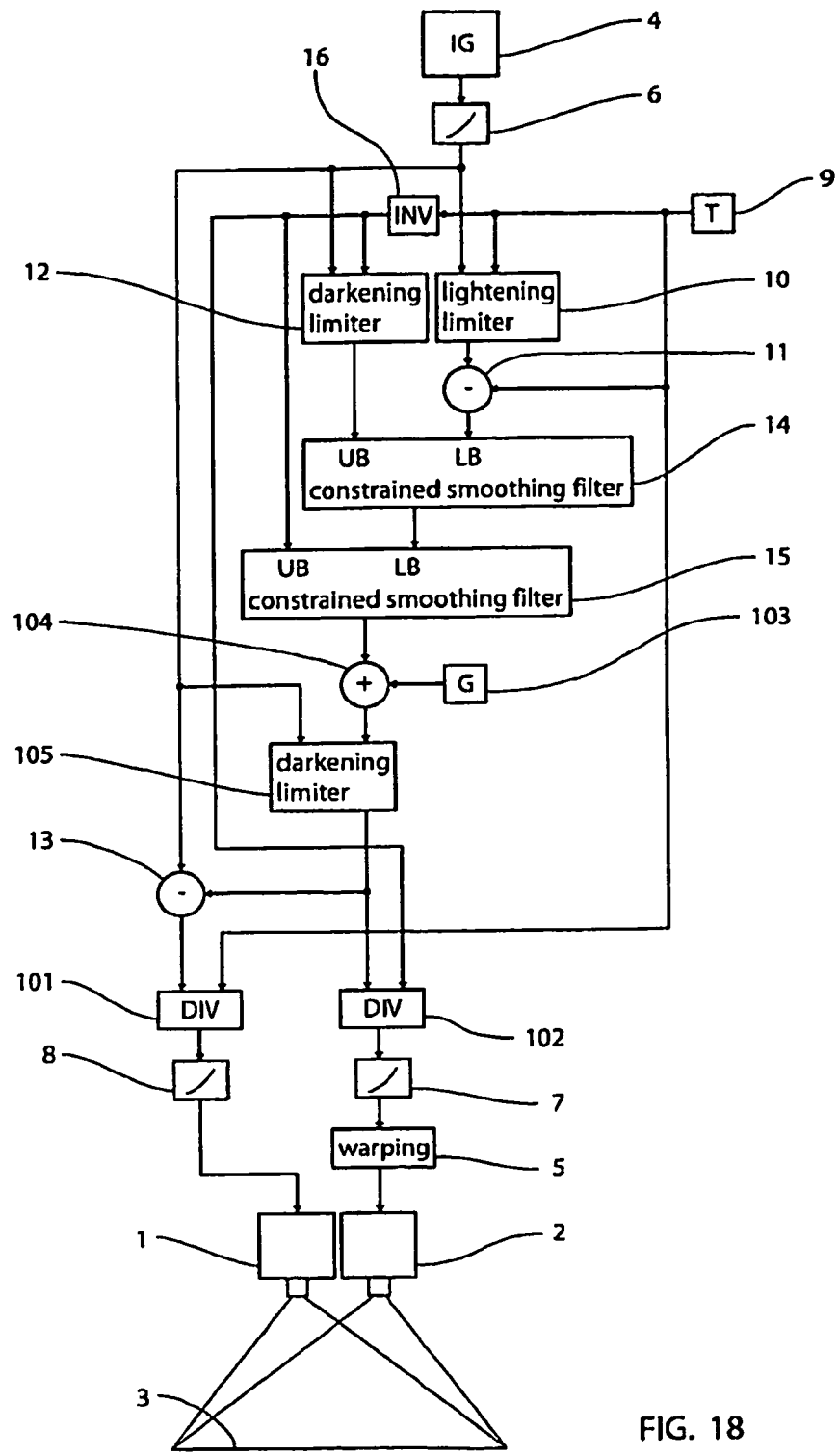
FIG. 18 illustrates an alternative embodiment of the present invention.

FIG. 18 shows yet an alternative configuration of the first embodiment, supporting an especially advantageous re-alignment procedure, where an image buffer 103 holding an alignment pattern, an image addition circuit 104 and a darkening limiter 105 are added. The output of the image buffer 103 is supplied to one input of the image addition circuit 104 and the output of the constrained smoothing filter 15 is supplied to another input the image addition circuit 104, and the output of the image addition circuit 104 is supplied to one input of the darkening limiter 105 and the output of the gamma correction circuit 6 is supplied to another input of the darkening limiter 105 and the output of the darkening limiter is supplied to one input of the image division circuit 102 and to one input of the image subtraction circuit 13, as shown in the figure. The output of the image buffer 103 may be switchable between a black picture and the alignment pattern, so the alignment pattern can effectively be switched off, when alignment detection is not requested. The effects of these added circuit elements on the projected images are that the image projected by projector 2 will be added a constrained alignment pattern, which is the output of the image buffer 103 being constrained, so that the result of the addition in each pixel position is still equal to or lower than the intensities of the corresponding pixel values in the source image, and the image projected by projector 1 will be subtracted the constrained alignment image, so when the two images are superimposed on the projection surface 3 with perfect alignment, the alignment pattern will be cancelled out and become invisible, so only the source image is visible. However, when a misalignment is introduced, the alignment pattern becomes visible as pattern sections of lower and higher intensities than the surrounding pixels. This enables easy and precise visual detection of any present misalignment. The position of lower and higher intensities indicates in which direction the misalignment is oriented. For example, if a section of an alignment pattern is visible as lighter pixel values compared to the surroundings, i.e. a lighter pattern imprint, and the same section of the alignment pattern is visible as darker pixel values compared to the surroundings, i.e. a darker pattern imprint, and the dark imprint is located to the right and below the light imprint, this indicates that projector 1 is displaced to the right and towards the lower edge relative to the position in which perfect alignment occurs. In this way, detection of misalignment can be executed during operation of the projection system, and even correction may be performed by adjusting the warping circuit 5. The alignment pattern may be designed, so it is not very noticeable to a general audience, though still useful for a projectionist, for example by comprising small graphic elements with regular spacing.

The alignment pattern may be a grid, a mesh or any regular or irregular pattern of elements which may be dots, cross hairs or other graphic elements and it may contain barcodes, semacodes or other identifiers.

Figure 19:
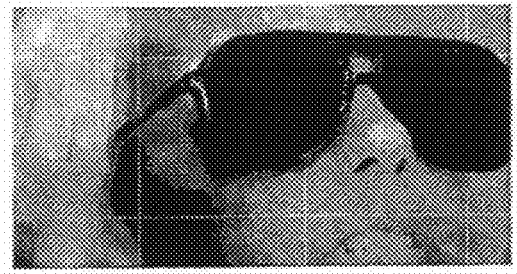
FIG. 19 illustrates the processing and output of the alternative embodiment described in relation to FIG. 18.
Figure 19:
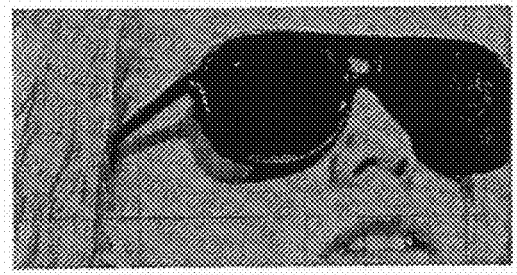
Figure 19:
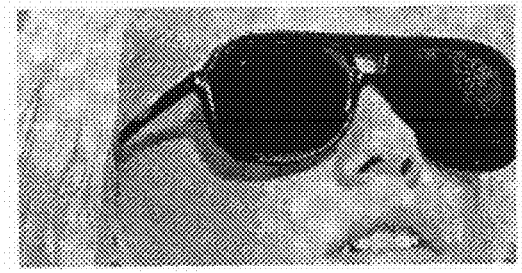
Figure 19:
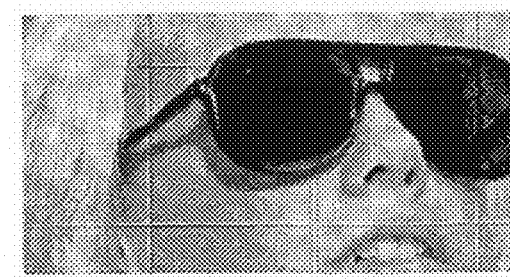

FIG. 19 shows example signals of the configuration of FIG. 18, where the first image is the output the darkening limiter 105 with the added alignment pattern visible, the second image is the output of image subtraction circuit 13 with the subtracted alignment pattern visible, the third image is the resulting superimposed image on the projection surface 3 with perfect alignment and the fourth image is an example of a resulting superimposed image on the projection surface 3 when misalignment is present.

In a colour image projection system comprising multiple configurations of the first embodiment each projecting a colour plane of the image, a first colour plane may be projected with an alignment pattern by the configuration shown in FIG. 18 and the other colour planes may be projected without alignment patterns. When the colour planes are projected by the same physical projectors, the mechanical misalignment of projectors and projection optics will affect the colour planes essentially identical, so the misalignment information observed from the first colour plane can be used to detect and correct the misalignment of all colour planes. This will further reduce the visibility of the alignment pattern to a general audience, especially if the colour plane with the alignment pattern is the blue colour plane, whereas the projectionist can observe the image through an optical filter having essentially the same colour as the colour plane with alignment image, thereby increasing the visibility of the alignment image to the projectionist.

Alternatively to having a projectionist observing the image manually, a camera may record the image on the projection surface 3 and an image processing system may detect and correct misalignment. The image processing system may perform feature matching or feature tracking, for example scale invariant feature tracking, to perform recognition of the alignment pattern or alignment pattern sections. Further, the camera may have a long exposure time, so that several different projected images, for example subsequent frames of a moving picture, are integrated in the image capturing element over one exposure, thereby blurring all non-static picture elements, but preserving the static alignment pattern for easier recognition of alignment pattern or alignment pattern sections. For example, the alignment pattern or alignment pattern sections may be separated from the integrated and blurred image by a high pass filtering. A sequence of images to be projected may be pre-processed, to increase the blurring of other elements than the alignment pattern when later integrated in the camera's image capturing element, for example a slow, cyclic motion may be introduced to static scenes of a sequence of a moving picture, or one of the colour planes, for example the blue colour plane, may be blurred in one or more or all of the frames of the moving picture.

In a colour image projection system comprising multiple configurations of the first embodiment each projecting a colour plane of the image, an additional colour correction circuit may be comprised, which adds to the pixel values in the colour channels of the outputs of the first constrained smoothing filters 14 in a way so that the hue of the pixels in the output of the first constrained smoothing filters 14 are essentially identical to the hues of the corresponding pixels in the output of the gamma decoding circuit 6. The additional colour correction circuit may perform an operation, where it for each pixel calculates a fraction value, which is the pixel value of the output of the first constrained smoothing filter 14 divided by the corresponding pixel value of the output of the gamma decoding circuit 6, then the additional colour correaction circuit identifies the greatest of the fraction values for each of the colour planes, i.e. for each of the multiple configurations of the first embodiments, and for each of the colour planes, a new pixel value is calculated by multiplying the output of the gamma decoding circuit 6 with the fraction value for the colour plane, and the resulting pixel value is supplied to the input of the second constrained smoothing filter 15. The advantage of this colour projection system is that the hues projected from the first projector 1 and from the second projector 2 will for each pixel be essentially identical, which may further decrease visible artefacts resulting from misalignment.

In a specially advantageous configuration, a 3D system is comprising two image processing circuits according to the first embodiment, a first image processing circuit according to the first embodiment being supplied a left perspective image of a 3D image and a second image processing circuit according to the first embodiment being supplied a left perspective image of said 3D image and three projectors, two stationary polarization filters, a temporal varying polarization unit, such as the RealD ZScreen or the RealD XL polarizing beam splitter arrangement with ZScreens, a non-depolarizing projection screen and eyewear with polarizers. A first projector is supplied the output of the second gamma encoding circuit 8 of said first image processing system and has a first polarization filter inserted in the optical path between the light source of said first projector and said projection screen, a second projector is supplied the output of the second gamma encoding circuit 8 of said second image processing system and has a second polarization filter inserted in the optical path between the light source of said second projector and said projection screen, said first polarization filter and said second polarization filter having essentially orthogonal polarization directions or opposite circular polarization direction, and where a third projector is projecting alternately the output of the first gamma encoding circuit or the resampling circuit of said first image processing system and the output of the first gamma encoding circuit or the resampling circuit of said second image processing system. In other words, two separate projection systems, one for a left eye image and one for a right eye image, use each one projector for the high frequency image and share a time multiplexed projector for the low frequency image.

The advantage of this configuration is that the third projector projects alternately the overlay images of the left and right perspective images that have low amounts of high frequency components, therefore the requirements to the performance of this projector in terms of resolution are relaxed, again allowing to optimize the projector for brightness on the cost of some resolution or image sharpness, for example utilizing a polarizing beam splitter with image combiner, such as for example the RealD XL adapter, which essentially doubles the light output of the projector, but at the cost of limiting the maximum obtainable resolution in practical implementations. This way, the same amount of light reaching the screen as with four projectors can be achieved using just three projectors. For example, a 3D projection system comprising three projectors with a 7 KW Xenon lamp each could result in the same brightness as that of a system comprising four projectors with 7 KW lamps each, which could be adequate for illuminating 3D giant screens. Such a system could rival existing filmbased 3D projection systems for giant screens in both image resolution, brightness, image stability, contrast, dynamic range and frame rate.

Figure 13:
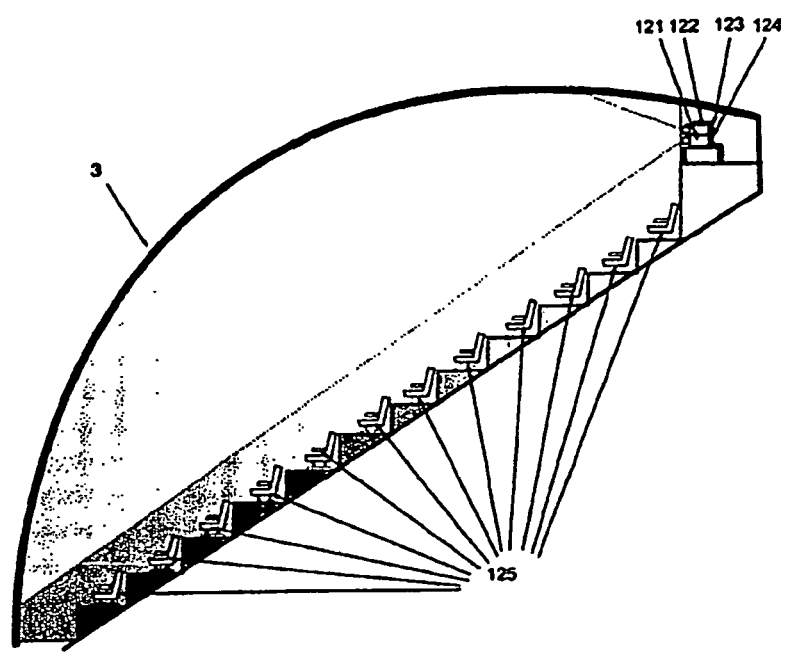
FIG. 13 illustrates an immersive stereoscopic projection configuration.

FIG. 13 shows an immersive, stereoscopic projection configuration with a total of four overlaid projectors, a first left projector 121, a second left projector 122, a first right projector 123 and a second right projector 124, where the first left projector 121 and the second left projector 122 are parts of a configuration according to the first embodiment and are projecting a left view of a stereoscopic image and where the first right projector 123 and the second right projector 124 are parts of a configuration according to the first embodiment and are projecting a right view in an immersive giant screen theatre where the projection surface 3 may be a domed screen or a big flat screen located close to the audience so a large portion of the field of view of the members of the audience located in the theatre seats 125 is filled with image and where the audience members are wearing stereoscopic eyewear. The projectors may be located off-axis close to the edge of the domed screen and may comprise wide angle or fisheye projection optics. The projection optics may be constructed so that pixel density is higher in an area, a "sweet spot", in front of the audience, as is well known in the art of immersive projection. The projection optics may further comprise anamorphic adaptors, which stretch the image in the vertical direction to fill a larger area of the dome. Additional warping circuits may be comprised, which performs a geometrical correction of the left eye source image and the right eye source image. The warping circuits may operate individually on each of the colour planes of the source images so they can be calibrated to further compensate for chromatic aberration in the projection optics. Alternatively to including image splitting circuits according to the first embodiment in the configuration, a playback system may be included, capable of synchronously reproducing previously recorded outputs from an image splitting circuit according to the first embodiment stored on at least one storage medium and supplying the reproduced outputs to the projectors. The storage medium may comprise at least one hard disk containing a first set of assets comprising a first signal for the first left projector 1, where the first signal is the recorded output of the second gamma encoding circuit 8 when the left source image was supplied to the input of the gamma decoding circuit 6 and a second signal for the first right projector 1, where the second signal is the recorded output of the second gamma encoding circuit 8 when the right source image was supplied to the input of the gamma decoding circuit 6, and further containing a second set of assets comprising a third signal for the second left projector, where the third signal is the recorded output of the first gamma encoding circuit 7 when the left source image was supplied to the input of the gamma decoding circuit 6, and a fourth signal for the second right projector, where the fourth signal is the recorded output of the first gamma encoding circuit 7 when the right source image was supplied to the input of the gamma decoding circuit 6. The first set of assets may be stored on the hard disk in the format of a stereoscopic Digital Cinema Package and the second set of assets may be stored on the hard disk in the format of a stereoscopic Digital Cinema Package. The first set of assets may be stored in an encrypted form and the playback system may be able to supply an encrypted signal to the input of the first left projector and an encrypted signal to the input of the first right projector. Further, a first warping circuit may be comprised located in the signal path from the playback system to the second left projector and a second warping circuit may be comprised located in the signal path from the playback system and the second right projector where the first warping circuit and the second warping circuit are calibrated for alignment of the images.

The projectors in the configuration of FIG. 12 may use spectral separation for separating the left and right eye views, where members of the audience wear eyewear with dichroic spectral separation filters and where the projectors comprise dichroic spectral separation filters. The separation filters of the first left projector 121 and the second left projector 122 may be essentially identical and the left eye separation filter in the eyewear may be matched to the separation filters of the first left projector 121 and the second left projector 122 and the separation filters of the first right projector 123 and the second right projector 124 may be essentially identical and the right eye separation filter in the eyewear may be matched to the separation filters of the first right projector 123 and the second right projector 124. Spectral separation stereoscopic projection has the advantage of not requiring a special projection surface which is attractive in many immersive cinema applications, and it has very good image quality and stereoscopic reproduction in a central part of the field of vision, but it has the disadvantage of introducing artefacts outside of the central part of the field of vision, because the filters in the eyewear differ from their nominal performance for incident light with angles not normal (perpendicular) to the filters, a phenomenon which is inherent in the nature of dichroic filters. For these reasons, an improved system for spectral separation stereoscopic projection shall be proposed below.

Figure 14:
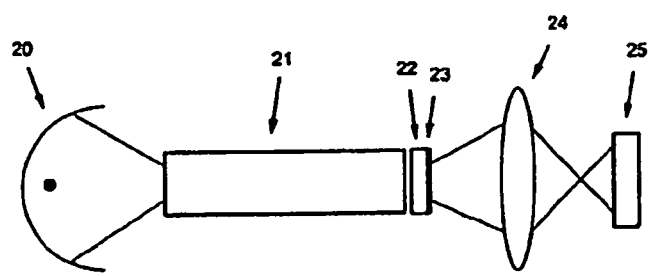
FIGS. 14-17 illustrate a preferred embodiment of a projection system according to the present invention.

FIG. 14 shows an example of prior art. A lamp 20 in a first projector emits light into an integrating rod 21 which creates a uniform illumination at the output end. A first projector filter 23, being a dichroic spectral separation filter resting on a glass substrate 22, is located adjacent to the output of the integrating rod 21, essentially in a focal plane of the illumination system 24, so an image of the first projector filter 23 is essentially focused on the spatial light modulator chips 25 of the projector. A second projector (not shown) is configured equivalently but with a second projector filter (not shown), which is mutually exclusive to the first projector filter 23. The first projector filter 23 and the second projector filter have mutually exclusive pass bands and in between there are spectral ranges called guard bands where both the first projector filter 23 and the second projector filter have little transmittance. The left eye separation filter in the eyewear may be a dichroic filter having a set of pass bands encompassing the pass bands in the first projector filter 23 and the right eye separation filter in the eyewear may be a dichroic filter having a set of pass bands encompassing the pass bands in the second projector filter. The separation filters in the eyewear may be slightly curved to partly compensate for the non-normal (non-perpendicular) angle of incident light from pixels in the peripheral areas of the image as observed by a member of the audience positioned with her head directed essentially straight forward with her nose towards the screen, because light with a non-orthogonal angle of incidence travels a longer distance between the dichroic layers of the separation filters, hence is subject to a filtering where the pass bands have been spectrally shifted compared to the filtering of light from pixels in the middle area of the image with essentially normal (perpendicular) angle of incidence, which would otherwise cause the match with the projector filters to be reduced beyond the tolerances provided by the guard bands in the projector filters, giving rise to colour artefacts and artefacts of crosstalk between left and right projection systems ("ghosting") in the peripheral parts of the image. It is normally not practical to use separation filters that are curved enough to completely compensate for the angles of incident light from different parts of the image for aesthetic reasons regarding the eyewear design and because the distance between eyes varies significantly in a population of different ages. The experience of the remaining artefacts in the peripheral parts of the image may be described as having a sheet of slightly coloured, semi-transparent, semi-reflective material with two fuzzy holes in front of your eyes attached to your head, the holes not completely covering the image, resulting in a sense of "tunnel vision". Therefore, further means to reduce the artefacts in the peripheral parts of the image are usually adopted comprising pre-wavelength shifting the projector filters, increasing the width of the guard bands at the cost of reduced brightness and further comprising reducing the size of the eye openings in the eyewear limiting the range of possible angles of incident light, thereby introducing a sharp and psychologically better accepted border of your field of view but obviously at the cost of a restricted field of view. However, for an immersive cinema application, artefacts in the peripheral field of vision will not be completely eliminated.

Figure 15:
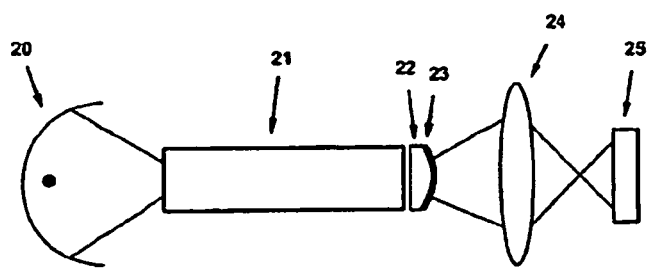

FIG. 15 shows an alternative configuration of the system in FIG. 14 where the colour and ghosting artefacts in peripheral parts of the image are compensated by modifying the first projector filter 23 and the second projector filter so the spectrally filtered light at the exit pupils of the projectors becomes wavelength shifted as a function of the angle of emission. The first projector filter 23 and the second projector filter are curved with essentially identical curves, so that light focused on pixels in the peripheral parts of the light modulator chips traverse longer distances between the dichroic layers than light focused on the central parts of the light modulator chips, hence light focused on the peripheral parts of the light modulator chips is wavelength shifted with respect to light focused on the central parts of the light modulator chips and therefore light emitted from pixels in the peripheral parts of the projected image is wavelength shifted with respect to light emitted from pixels in the central parts of the projected image, resulting in a better match of the filtering by the projector filters and the filtering of the eye filters for pixels in the peripheral parts of the image, and in more pixels in the peripheral parts of the image being filtered by the eye filters so that the pass bands of the eye filters encompass the pass bands of the projector filters when observed by a member of the audience in a target observation position. Other members of the audience located at other positions may observe a slightly undercompensated or overcompensated image, but still observe a better image than without compensation. The curve of the first projector filter 23 and the second projector filter may be spherical with radii equal to the width of the aperture of the integrating rod 21. An electronic colour correction is normally applied to the source image to compensate for a slight hue changes as perceived by the Human Visual System in the filters, which cannot be avoided completely for manufacturing reasons. This colour correction is normally spatially uniform over the image area. In the case of using curved filter, this colour correction may instead be spatially nonuniform, so as to achieve projected images that are perceived as uniform in hue to the Human Visual System. Alternatively to comprising curved filters, dichroic filters with varying thickness of the dielectric layers may be comprised.

The experience of watching an image compensated with curved filter is hard to describe, but appears somewhat more pleasing than the "uncompensated experience". It can be described as enlargening the fuzzy holes in the slightly coloured, semi-transparent, semi-reflective sheet so the full image can be seen through them when your face is oriented forwards towards the screen, but the sheet is now detached from your head, though still close, so when you move your head away from the straight looking forward orientation, the edges of the fuzzy holes enter your field of vision, like gazing through a pair of holes in thin drapes.

Figure 16:
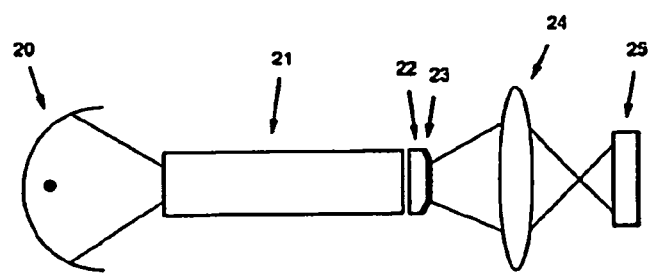

FIG. 16 shows an alternative configuration, where the first projector filter 23 and the second projector filter may each have a flat area in a central region and only have a curved shape in the peripheral areas of the image where the tolerance by above the mentioned other means of reducing the artefacts in peripheral areas of the image do not suffice. The optimal curve of the projector filters is a function of the distance from the member of the audience to the screen, the curve of the eye filters, the focal length of the relay lenses of the illumination system of the projectors, subjective aesthetic preferences and other factors. A compromise between the "tunnel vision" and "gazing through a pair of holes" may be desirable.

Figure 17:
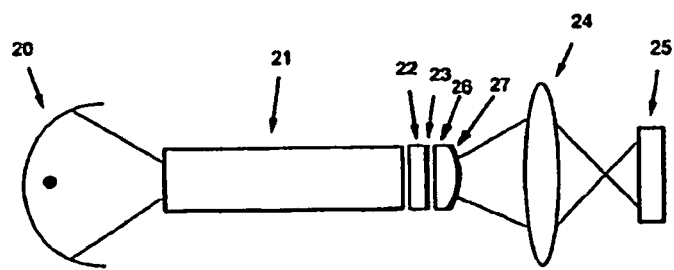

FIG. 17 shows yet an alternative configuration equivalent to the configuration of FIG. 14, but where a first curved notch filter 27 resting on a first glass substrate 26 is added located in front of the first projector filter 23 in the left projector and a second curved notch filter resting on a second glass substrate are added correspondingly in the second projector, and where the notch filters have notches essentially matching the guard bands, so the width of the guard bands are being widened as a function of the emission angle of light exiting the exit pupils of the projectors, hence reducing artefacts in the peripheral field of vision and eliminating ghosting artefacts in the central field of vision in the case where the observer turns her head to a large angle that may occur in the configurations according to FIGS. 14, 15 and 16, although at the cost of reducing the brightness in the peripheral parts of the projected images. The notch filters may have a flat area in a central part of the image.

The invention is additionally or alternatively characterized by an image processing circuit separating an input image into a first image, being the input image clamped to a threshold, and a second image, being the remainder. The second image is smoothened by moving fractions of pixel values from the first image to the darker areas around edges, reducing the content of high-frequency components in the second image, keeping the sum of the two images identical to the input image. Scaling and gamma corrections are performed at the input and outputs, ensuring that actual luminance superposition applies to the calculations. With perfect alignment, the projected overlaid image will correspond exactly to the input image, whilst the second image will have less high frequency components than the first image.

A first advantage is that the system significantly reduces the perceived artefacts arising from minor misalignment, since the human visual system is less sensitive to errors in low frequency components than in high frequencies. Only where there are edges having a contrast higher than one projector can "drive" alone, the second image will contain high frequency components. However, the human visual system exhibits a lower spatial resolution close to edges of contrasts of 150:1 and above, due to the so called spatial masking effect, so misalignment artefacts at high contrast edges will also be reduced in visibility. A low-pass filtering of the second image, moderate enough to be invisible due to the masking effect of the first image's high frequency components, may help masking misalignment artefacts at high contrast edges further.

A second advantage is that a camera-based automatic alignment system can periodically perform realignment throughout a film projection, based on the images in the film, with no need for special calibration sequence runs. Because the projectors do not project identical images, it is possible to separate the first and the second image from the recorded on-screen image, and from those calculate misalignment information, which in turn may be used for electronic re-alignment by geometric correction (warping).

A third advantage is that a single-projector 2K system can be upgraded to increased brightness and 4K resolution, by adding a 4K projector. Since an invisible moderate low pass filtering of the second image is possible, it results in that it is possible to use a lower resolution projector for the second image, maintaining the appearance of the full high resolution of the first projector (only brighter). A fourth advantage is that the resulting luminance resolution of the system is higher than that of a single projector, which could be of significance to high dynamic range projection systems.

The invention is additionally or alternatively characterized by the points:

1. An image projection system comprising two image projectors, a first projector and a second projector, where said first projector and said second projector project overlaid images onto a projection surface, resulting in a superimposed image, further comprising a first image processing circuit, which separates an input image into two images: a first projector image being input to said first projector and a second projector image being input to said second projector, so that when said first projector is projecting said first projector image and said second projector is projecting said second projector image, the overlaid image formed on the projection surface essentially corresponds to said input image, and where the amount of high spatial frequencies is lower in said second projector image than in said first projector image.

2. An image projection system according to point 1, where colour correction circuits are added to both of said projector's inputs, calibrated so that the resulting projector transfer functions between pixel values and projected colour plane luminances become essentially linear and identical, so that the resulting projected colour plane luminances at a point on the display surface is essentially a function of the sum of the corresponding pixel values of said first projector image and the corresponding pixel values of said second projector image, when said corresponding pixel values of said first projector image is within the range 0 to B1 and said corresponding pixel values of said second projector image is within the range 0 to B2, where B1 is the pixel value corresponding to the maximum colour plane luminance of said first projector and B2 is the pixel value corresponding to the maximum colour plane luminance of said second projector, and where the calculation of said second projector image comprises, for each pixel value of essentially all pixels in the input image, calculating the value that exceeds B1, and where said first projector image is calculated by subtracting said second projector image from said input image, and where the pixel values of said input image is within the range 0 to B, where B=B1+B2 is the pixel value corresponding to maximum colour plane luminance of the resulting superimposed image.

3. An image projection system according to point 2, where said calculation of said second projector image further comprises a smoothing process, adding amounts to pixel values in said second projector image in a way, so that high frequency components in said second projector image are reduced, and where said amounts are limited to be within zero and the corresponding pixel values in said first projector image.

4. An image projection system according to point 3, where said smoothing process comprises adding halos to edges in said second projector image, where the halos extend into the darker side of the edges gradually fading with increasing distance from the edges.

5. An image projection system according to point 3 or 4, where said smoothing process comprises a weighted greyscale dilation applied to each of the colour planes of said second projector image, where said weighted greyscale dilation is defined as a greyscale dilation with a structuring element D and where the input pixels are first multiplied by the elements of a filtering kernel F.

6. An image projection system according to points 1-5, further comprising a low-pass filter with a convolution kernel L or other smoothening filter inserted between said first image processing circuit and said second projector.

7. An image projection system according to points 1-6, where said second projector has a lower spatial resolution than said first projector.

8. An image projection system according to points 5-7, where the greyscale dilation structuring element D is a disc shaped element with a radius of 0.2% of the image width, the filtering kernel F is a distance function with a radius of 0.2% of the image width and the convolution kernel L is a Gaussian kernel with a radius of 0.1% of the image width.

9. An image projection system according to points 1-8, further comprising an automatic alignment system comprising at least one camera capable of recording images of said resulting projected image on said projection surface and a second image processing circuit, capable of isolating a first set of features originating from said first projector image in an image recorded by said camera(s) and isolating a second set of features originating from said second projector image in said image recorded by said camera(s) and capable of spatially correlating said first set of features and said second set of features to features of said input image and from said correlations calculating spatial misalignment information, further comprising a third image processing circuit, capable of geometrically correcting at least one of said first projector image and said second projector image, based on said misalignment information, so said first projected image and said second projected image become geometrically aligned.

10. An image projection system according to point 9, where said second image processing circuit comprises a colour correction circuit, producing from said recorded image a conformed recorded image, calibrated so that the transfer function between pixel values and colour plane luminances of the overlaid image on said display surface is essentially identical to said projector transfer functions, and where said second image processing circuit seeks to identify at least one low-luminance area(s) in which all pixel values of said conformed recorded image are below a threshold T, where T is less than or equal to B1, and performs a first set of feature matching operations with said first projector image in at least one feature matching area(s) within said low-luminance area(s) resulting in a first set of offset vectors, and where said second image processing circuit can perform a geometrical correction of said conformed recorded image based on said first set of offset vectors, so that the geometrically corrected, conformed recorded image is aligned with said input image and where said second image processing circuit subtracts said first projector image from said geometrically corrected, conformed recorded image and on the resulting image performs a second set of feature matching operations in at least one area(s) with said second projector image resulting in a second set of offset vectors, and where said third image processing circuit is capable of geometrically correcting at least one of said second projector image and said second projector image based on said first set and said second set of offset vectors, so said first projected image and said second projected image become essentially geometrically aligned, and where said feature matching operations may be template matching operations, scale invariant feature tracking operations or any other feature tracking operations known in the art.

11. An image projection system according to points 9 and 10, where said automatic alignment system perform repeated cycles during presentation of a moving picture, a live transmission, a still image or other content, to reduce geometric misalignment arising during projection.

12. An image projection system according to points 1-11, where more than two projectors are projecting overlaid images, said first image processing circuit outputting more than two images, each having different amounts of spatial frequencies and where said second image processing circuit is capable of isolating features in said recorded image originating from each of said projectors.

13. An image projection system according to points 1-12, further comprising any modifications and configurations included in the technical description or evident to a person skilled in the art.

The invention is additionally or alternatively characterized by the additional points:

1. An image projection system comprising an essentially hemispheric, dome shaped projection surface and at least one image projector located near the edge of said domed shaped projection surface, where said image projector projects an image onto the inside of said dome shaped projection surface and where the projected image covers at least 70% of said dome shaped projection surface, comprising a wide angle projection objective, a fish-eye projection objective, a wide-angle conversion lens, a wide-angle conversion mirror, an inverse afocal optical system or a retrofocus optical system or a combination of any of these, further comprising a first image processing circuit which performs a geometrical correction of an input image and sends a corrected output image to the input of said projector.

2. An image projection system according to the additional point 1 further comprising an anamorphic adaptor comprising at least one prism located in the light path between the image forming element and the screen, where said anamorphic adaptor is stretching said image in one direction.

3. An image projection system according to additional points 1 or 2, where said first image processing circuit is calibrated, so that said projected image essentially has the same geometry as a projected image from a fish-eye projector located essentially at the center of said hemispheric, dome shaped projection surface, when said input image is being input to said fish-eye projector.

4. An image projection system according to additional points 1-3, where said first image processing circuit is able to perform separate geometrical corrections of each of the colorplanes of said input image, and where said first image processing circuit is calibrated so that said geometrical corrections compensates for chromatic aberrations in the optical elements of said image projection system.

5. An image projection system according to additional points 1-4, where at least one area located in said dome shaped projection surface has a higher spatial resolution than the average spatial resolution of said projected image, and where said input image has a higher spatial resolution than said corrected output image, and where said image processing circuit essentially preserves as much spatial resolution from said input image to said output image as possible.

6. An image projection system according to additional points 1-5, further comprising a second image processing circuit able to calculate from said corrected output image a reflection-error image, where said reflection-error image is an estimate of the total reflected light that will be received at each position on the display surface from other parts of the display surface by scattering, if said input image were to be projected onto the display surface by said projector, where said reflection-error image may be calculated based on a set of screen measurements and where said reflection-error image may be calculated by radiosity calculations, and where said image processing circuit essentially subtracts said reflection error image from said input image (negative values being set to zero) resulting in a compensated image, which may be sent to the input of said projector.

7. An image projection system according to additional point 6, where local contrast enhancement is applied to areas of said compensated image, where full cancellation of reflected light is not achieved by the subtraction of said reflection-error image.

8. An image projection system according to the additional point 7, where a remainder-error image is calculated as the difference between said reflection-error image and the result of a subtraction of said compensated image from said corrected output image, and where a contrast enhanced compensated image is calculated from said compensated image by local contrast enhancement and where said remainder-error image is low-pass filtered and then used as a key in a keying operation between said compensated image and said contrast enhanced compensated image, and where the resulting image of the keying operation is sent to the input of said projector.

9. An image projection system according to additional points 7 or 8, where said local contrast enhancement is an unsharp mask operation or a local tone mapping operation.

10. An image projection system according to additional points 1-9, further comprising any modifications and configurations included in the technical description or evident to a person skilled in the art.

The invention claimed is:

1. A method of producing from a received image and a threshold image a first image and a second image, comprising:
   determining an upper bound image and a lower bound image based on pixel values of each of the received image and the threshold image;
   producing the first image and the second image by using a smoothing filter process in combination with the upper bound image, the lower bound image, the received image and the threshold image, wherein the first image has a different spatial content frequency than the second image based on the smoothing filter process;
   projecting the first image onto a surface by a first projector; and
   projecting the second image onto the surface by a second projector,
   wherein the first image and the second image have pixel values that are within illumination limits of the first projector and the second projector.

2. The method of claim 1, wherein the lower bound image represents pixel values that exceed a illumination intensity limit of the first projector or the second projector.

3. The method of claim 1, wherein the upper bound image represents maximum pixel values contributable by the first projector or the second projector onto the surface.

4. The method of claim 1, wherein determining the lower bound image comprises:
  i. determining for each corresponding pixel between the received image and the threshold image a maximum pixel value; and
  ii. determining a difference value by subtracting a corresponding threshold value from the maximum pixel value for each pixel,
  wherein determining the upper bound image comprises determining for each corresponding pixel between the received image and an inverted threshold image the minimum pixel value.

5. The method of claim 1, further comprising:
balancing illumination between the first projector and the second projector by controlling a representation of a fraction of illumination intensity in the threshold image for each pixel of which the first projector and the second projector contributes to the surface.

6. The method of claim 1, wherein the smoothing filter process comprises:
  i. receiving the upper bound image and the lower bound image; and
  ii. performing a dilation operation followed by a blur operation on each pixel of the lower bound image.

7. The method of claim 6, wherein the smoothing filter process further comprises determining a minimum of corresponding pixels of a filtered lower bound image and the upper bound image for each pixel.

8. The method of claim 1, further comprising:
gamma decoding the received image.

9. The method of claim 1, further comprising:
gamma encoding the first image prior to projecting the first image; and
gamma encoding the second image prior to projecting the second image.

10. The method of claim 1, further comprising:
warping at least one of the first image or the second image prior to projecting the first image and projecting the second image.

11. The method of claim 1, further comprising:
balancing intensity of the first image and the second image, wherein the smoothing filter process comprises a constrained smoothing filter process.

12. The method of claim 1, wherein projecting the second image onto the surface by the second projector comprises:
causing the second image to be superimposed and geometrically aligned with the first image projected by the first projector.

13. The method of claim 1, wherein producing the first image comprises:
determining a difference of corresponding pixels between the received image and an image outputted from the smoothing filter process; and
dividing by corresponding pixels of the threshold image for each pixel.

14. The method of claim 13, wherein producing the second image comprises dividing an output of the smoothing filter process with corresponding pixels of an inverted threshold image for each pixel.

15. An image projection system, comprising:
image processing circuitry configured for:
  generating a first image and a second image from an input image using a constrained smoothing filter process, wherein the first image and second image are different based on the constrained smoothing filter process;
  balancing intensity of the first image and the second image; and
  producing a warped image by warping the second image;
a first projector for projecting the first image;
a second projector for projecting the warped image; and
a screen on which the first image projected by the first projector is configured to be superimposed and geometrically aligned with the warped image projected by the second projector.

16. The image projection system of claim 15, wherein the image processing circuitry is configured for:
determining an upper bound image and a lower bound image based on pixel values of each of the input image and a threshold image;
generating the first image and the second image by using the constrained smoothing filter process in combination with the upper bound image and the lower bound image; and
causing the first image and the warped image to have pixel values that are within illumination limits of the first projector and the second projector.

17. An image projection system, comprising:
a first projector for projecting a first image;
a second projector for projecting a second image having different spatial content frequency than the first image to overlay the first image on a projection surface; and
image processing circuitry adapted for generating the first image and the second image from a received image using at least one smoothing filter in combination with an upper bound image and a lower bound image determined based on pixel values of each of the received image and a threshold image.

18. The image projection system of claim 17, wherein the image processing circuitry is adapted for:
generating the first image and the second image having pixel values that are within illumination limits of the first projector and the second projector; and
generating the second image having different spatial content frequency than the first image based on the at least one smoothing filter.

19. The method of claim 1, further comprising:
limiting a projector illumination intensity demand to within an illumination intensity contribution capability of each of the first projector and the second projector using the threshold image.

20. The method of claim 19, wherein the threshold image is a fraction of a total illumination intensity that is contributed by the first projector or the second projector, the total illumination intensity being an illumination on the surface of a corresponding pixel value of the first image and the second image projected on the surface, the fraction representing the illumination intensity that one of the first projector or the second projector is able to contribute to the corresponding pixel value.

21. The method of claim 20, wherein the threshold image is a spatial distribution of the fraction of the total illumination intensity that is contributed by the first projector or the second projector.

22. The method of claim 1, wherein the first image projected onto the surface and the second image projected onto the surface are misaligned by a misalignment amount to produce a visible misalignment artefact that is less visible than the first projector and the second projector projecting the received image with a misalignment of the misalignment amount.

* * * * *